US007644351B1

(12) United States Patent
Portnoy et al.

(10) Patent No.: US 7,644,351 B1

(45) Date of Patent: Jan. 5, 2010

(54) DATA COLLECTION AND PROCESSING SYSTEM AND METHODS

(75) Inventors: Gregory Portnoy, Potomac, MD (US); Richard A. Wiseman, Falls Church, VA (US)

(73) Assignee: Information Sciences Corporation, Kensington, MD (US)

( * ) Notice: Subject to any disclaimer, the term of this patent is extended or adjusted under 35 U.S.C. 154(b) by 573 days.

(21) Appl. No.: 11/166,211

(22) Filed: Jun. 27, 2005

(51) Int. Cl.
*G06F 17/00* (2006.01)

(52) U.S. Cl. ....................................... 715/226; 715/224

(58) Field of Classification Search ................. 715/505, 715/506, 507, 508, 221–226
See application file for complete search history.

(56) References Cited

U.S. PATENT DOCUMENTS

| | | | | |
|---|---|---|---|---|
| 5,765,158 | A * | 6/1998 | Burrows | 707/101 |
| 6,016,467 | A * | 1/2000 | Newsted et al. | 704/9 |
| 6,105,072 | A * | 8/2000 | Fischer | 719/315 |
| 6,301,591 | B2 * | 10/2001 | Katsumata et al. | 715/222 |
| 6,651,219 | B1 * | 11/2003 | Elliott | 715/530 |
| 7,200,806 | B2 * | 4/2007 | Sahu | 715/224 |
| 7,203,699 | B2 * | 4/2007 | Bellamy | 707/102 |
| 2002/0016721 | A1 * | 2/2002 | Mason et al. | 705/3 |
| 2002/0062162 | A1 * | 5/2002 | Bunkofske et al. | 700/108 |
| 2002/0143739 | A1 * | 10/2002 | Makino et al. | 707/1 |
| 2002/0198903 | A1 * | 12/2002 | Robison et al. | 707/500 |
| 2003/0140312 | A1 * | 7/2003 | Mohan et al. | 715/513 |
| 2003/0188260 | A1 * | 10/2003 | Jensen et al. | 715/505 |
| 2003/0233370 | A1 * | 12/2003 | Barabas et al. | 707/103 R |
| 2004/0039990 | A1 * | 2/2004 | Bakar et al. | 715/505 |
| 2004/0039991 | A1 * | 2/2004 | Hopkins et al. | 715/507 |
| 2004/0078271 | A1 * | 4/2004 | Morano et al. | 705/19 |
| 2004/0083426 | A1 * | 4/2004 | Sahu | 715/505 |
| 2004/0088283 | A1 * | 5/2004 | Lissar et al. | 707/3 |
| 2004/0205525 | A1 * | 10/2004 | Murren et al. | 715/505 |
| 2005/0028082 | A1 * | 2/2005 | Topalov et al. | 715/505 |
| 2005/0065982 | A1 * | 3/2005 | Bailey et al. | 707/104.1 |
| 2005/0183003 | A1 * | 8/2005 | Peri | 715/507 |
| 2005/0198563 | A1 * | 9/2005 | Kristjansson | 715/507 |
| 2005/0257148 | A1 * | 11/2005 | Goodman et al. | 715/534 |
| 2005/0268213 | A1 * | 12/2005 | Liu et al. | 715/500.1 |
| 2006/0200754 | A1 * | 9/2006 | Kablesh et al. | 715/505 |

OTHER PUBLICATIONS

U.S. General Services Administration (GSA), Office of Governmentwide Policy, Forms and Printing Policy Division, Statement of Work (SOW), May 20, 2005.

* cited by examiner

*Primary Examiner*—Cong-Lac Huynh
(74) *Attorney, Agent, or Firm*—Miles & Stockbridge, P.C; Eric G. King

(57) ABSTRACT

Systems and methods for data collection and processing. A system includes a forms processing subsystem including a form designer and a form processing and workflow module, and a client subsystem including a form submission manager and a client data store. User provided information is maintained locally in the client data store.

33 Claims, 15 Drawing Sheets

Data Catalog Element Links

1100

Data Catalog Home Elements Logout

Form Objects

| Form | Description | Object | Action |
|---|---|---|---|
| 940 | Employer's Annual Federal Unemployment (FUTA) Tax Return | EIN | Delete Link |
| 5500 | Annual Return/Report of Employee Benefit Plan | SponsorEIN | Delete Link |
| QFR-101 (MG) | Manufacturing, Mining, and Wholesale Trade Quarterly Financial Report | EIN | Delete Link |
| Richard's Form | Demo Form | EIN | Delete Link |

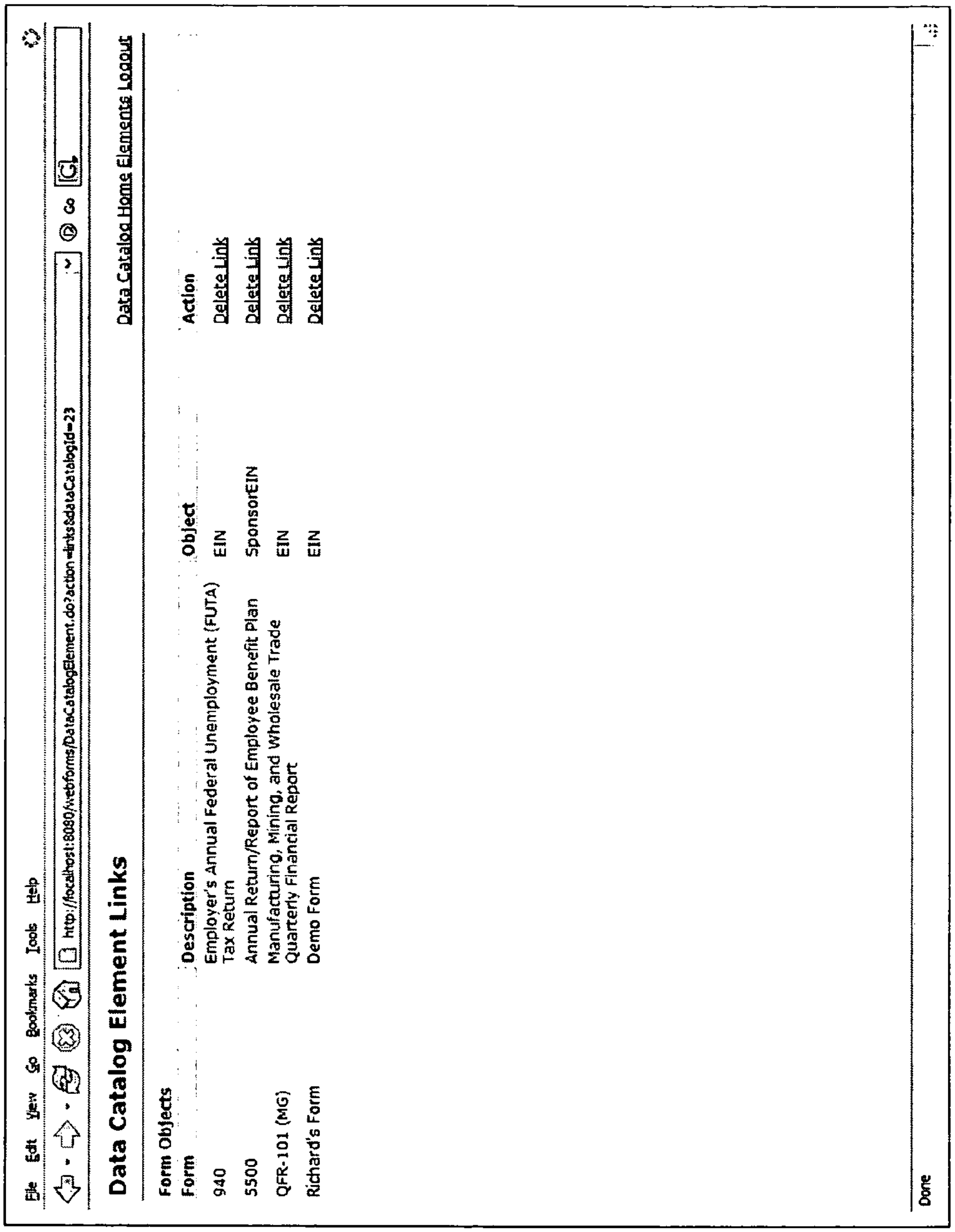

*FIG. 11*

Data Catalog Elements

1200

Data Catalog Home Logout

Global Elements

| Name | Description | Action |
|---|---|---|
| ActiveParticipants | | View Links Delete |
| AdditionalCredit1 | | View Links Delete |
| AdditionalCredit2 | | View Links Delete |
| AdditionalCredit3 | | View Links Delete |
| AdditionalCredit4 | | View Links Delete |
| AdditionalCredit5 | | View Links Delete |
| AdditionalTax | | View Links Delete |
| AdditionalTax2 | | View Links Delete |
| Add_2_3 | | View Links Delete |
| AdminCity | | View Links Delete |
| AdminCO | | View Links Delete |
| AdminEIN | | View Links Delete |
| AdminForeignCountry | | View Links Delete |
| AdminForeignRouting | | View Links Delete |
| AdminName | | View Links Delete |
| AdminPhone | | View Links Delete |
| AdminSignature | | View Links Delete |
| AdminSignDate | | View Links Delete |
| AdminState | | View Links Delete |
| AdminStreet | | View Links Delete |
| AdminZip | | View Links Delete |
| AllowDesignee | | View Links Delete |
| AmendedReturn | | View Links Delete |
| BalanceDue | | View Links Delete |
| BusinessCity | Business City | View Links Delete |
| BusinessEIN | Employer Identification Number | View Links Delete |
| BusinessName | Business Name | View Links Delete |
| BusinessPhone | Business Phone Number | View Links Delete |
| BusinessState | Business State | View Links Delete |
| BusinessStreet | Business Street Address | View Links Delete |
| BusinessZip | Business ZIP Code | View Links Delete |
| CollectiveBargain | | View Links Delete |

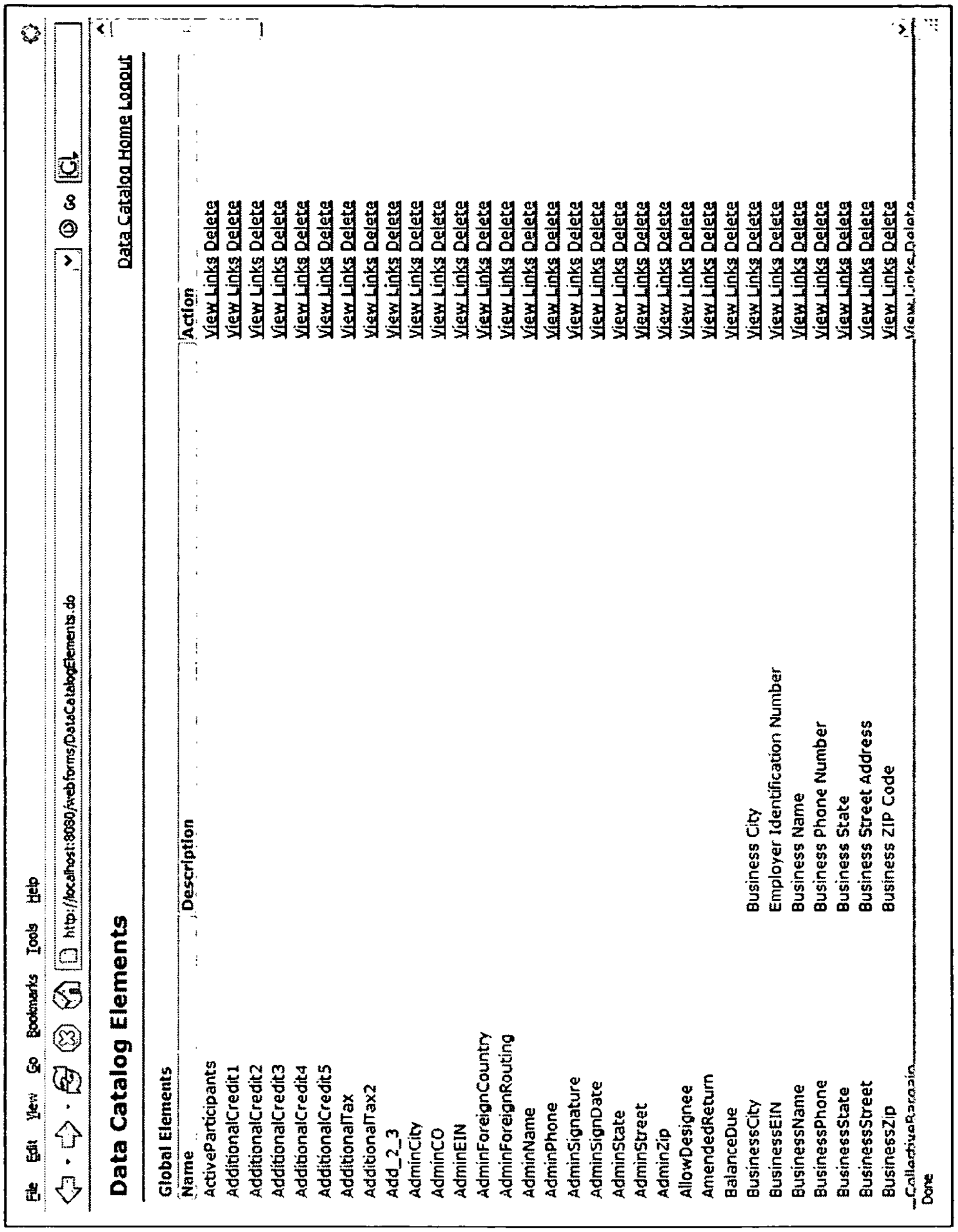

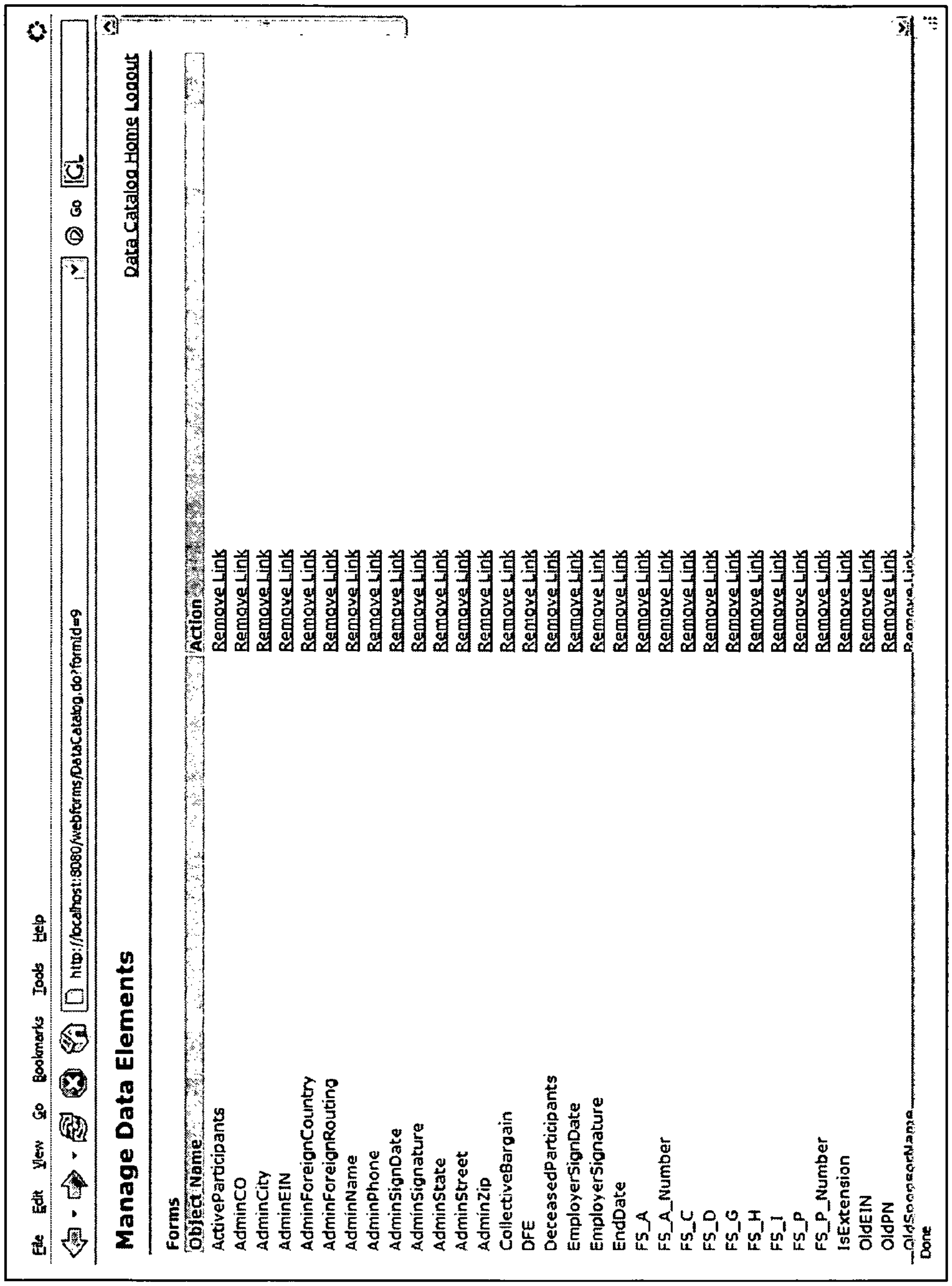

FIG. 13

Manage Data Elements

Forms

| Object Name | Action |
|---|---|
| ActiveParticipants | Remove Link |
| AdminCO | Remove Link |
| AdminCity | Remove Link |
| AdminEIN | Remove Link |
| AdminForeignCountry | Remove Link |
| AdminForeignRouting | Remove Link |
| AdminName | Remove Link |
| AdminPhone | Remove Link |
| AdminSignDate | Remove Link |
| AdminSignature | Remove Link |
| AdminState | Remove Link |
| AdminStreet | Remove Link |
| AdminZip | Remove Link |
| CollectiveBargain | Remove Link |
| DFE | Remove Link |
| DeceasedParticipants | Remove Link |
| EmployerSignDate | Remove Link |
| EmployerSignature | Remove Link |
| EndDate | Remove Link |
| FS_A | Remove Link |
| FS_A_Number | Remove Link |
| FS_C | Remove Link |
| FS_D | Remove Link |
| FS_G | Remove Link |
| FS_H | Remove Link |
| FS_I | Remove Link |
| FS_P | Remove Link |
| FS_P_Number | Remove Link |
| IsExtension | Remove Link |
| OldEIN | Remove Link |
| OldPN | Remove Link |
| OldSponsorName | Remove Link |

DATA COLLECTION AND PROCESSING SYSTEM AND METHODS

This disclosure contains information subject to copyright protection. The copyright owner has no objection to the facsimile reproduction by anyone of the patent disclosure or the patent as it appears in the U.S. Patent and Trademark Office files or records, but otherwise reserves all copyright rights whatsoever.

BACKGROUND

1. Field of Invention

The present invention relates to the field of data processing and, more specifically, to data processing methods and systems for creating and populating forms.

2. Description of Related Art

The use of standardized HTML forms to collect and capture data has proven to be a useful way to organize and collect information. The use of such forms is commonplace today. The widespread availability of computers has led to the development of automated forms processing methods and systems that provide increased efficiency, reliability, and data persistence. In particular, existing automated forms processing methods and systems make possible the collection and retention of vast amount of information. Such information may include personal or confidential information. Government agencies, in particular, collect large amounts of such information using standardized forms.

Various organizations have developed their own unique or proprietary forms based on the information needed to be collected by the organization. For example, the Internal Revenue Service collects taxpayer information using a Form 1040 as well as many other related forms. Within a given organization, as well as among organizations, the information to be collected may include much of the same information such as, for example, a person's first and last names. Despite the similarities of the information collected using different forms of the same organization or of other organizations, existing systems and methods do not allow for fast and efficient reuse of information already collected when the same or similar information has to be subsequently collected from a user.

Furthermore, in existing data processing systems having a client-server architecture, the data processing and maintenance functions tend to be concentrated on the server side. This approach can lead to service delays to client users, because the client user has to wait for a response from the server, thereby impacting system response time from the client's perspective. In addition, existing systems require the server side to provide storage capacity for vast amounts of collected information. The cost required to provide and maintain this capacity involves a substantial and ongoing outlay of time, money, and technical resources. Furthermore, concentrated personal or company information at the server side leaves the information more vulnerable to a single security attack, giving rise to privacy concerns for massive amounts of personal information. Still further, existing systems and methods require large amounts of program data to be downloaded from a server to a client in order for a client user to be able to enter data into form templates.

Thus, there is a need for systems and methods to address these limitations as well as others readily discernable from review of this disclosure.

SUMMARY

Embodiments are directed generally to systems and methods for data collection and processing. Various embodiments may be directed to a method and system for establishing a form data elements cross-reference index, retrieving prepopulation data from a local client data store based on the cross-reference index, and outputting a prepopulated form to a user. Embodiments may also include a forms processing subsystem including a form designer and a form processing and workflow module, and a client subsystem including form submission manager and a client data store.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and:

FIG. 11 is an example similar data elements report in accordance with at least one embodiment:

FIG. 12 is an example cross reference counts report in accordance with at least one embodiment; and FIG. 13 is an example data elements catalog in accordance with at least one embodiment.

DETAILED DESCRIPTION

Embodiments are directed generally to data collection and processing systems and methods. For example, the methods and systems may provide for the generation and submission of completed forms as well as the capability for an administrative user to create and modify forms, including content fields and their location, formatting, and form style or look and feel.

Figure 1:
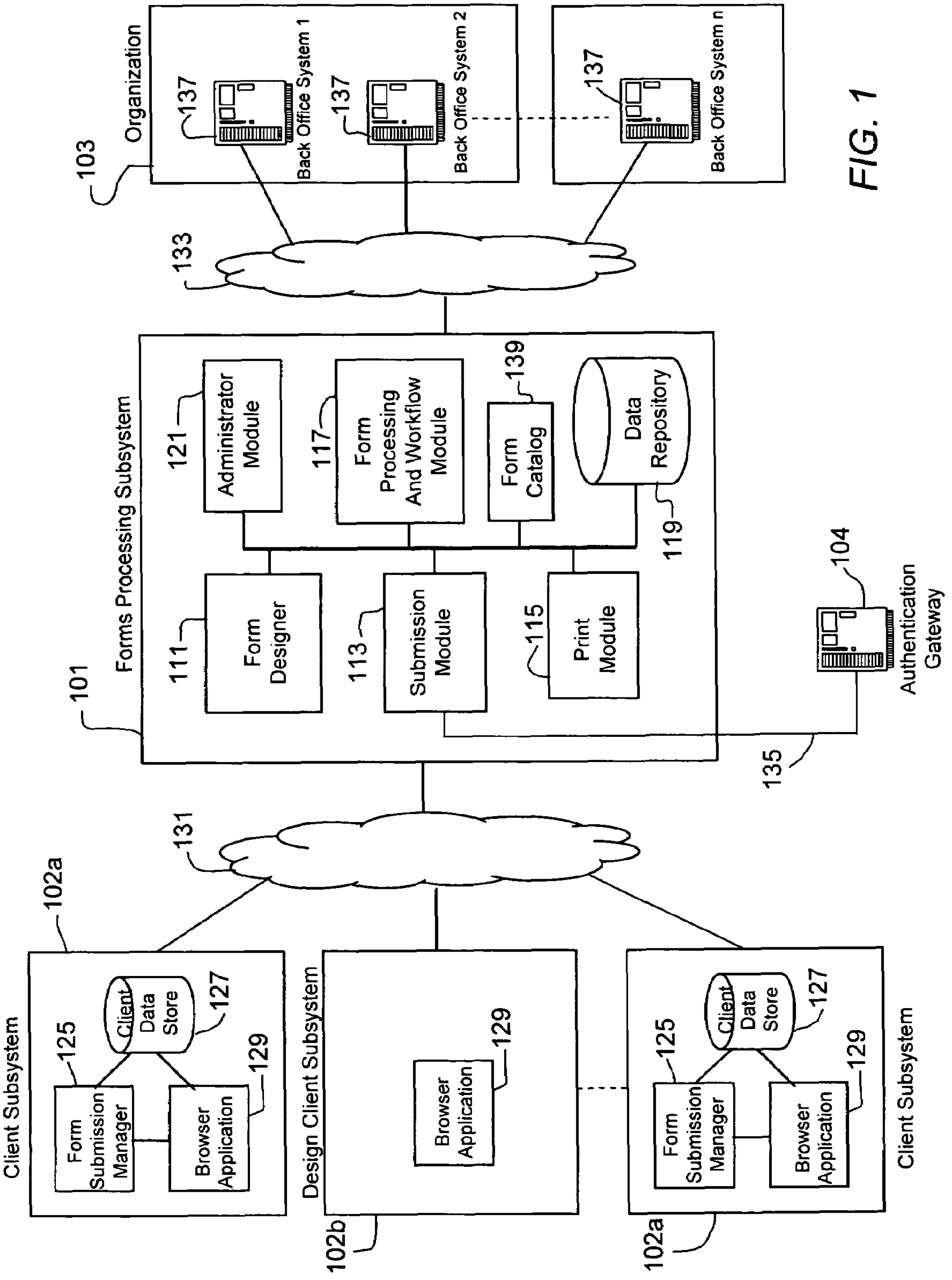
FIG. 1 is a top level system block diagram showing a data collection and processing system according to at least one embodiment.

FIG. 1 is a top level system block diagram showing a data collection and processing system according to at least one embodiment. Referring to FIG. 1, the data collection and processing system 100 may include at least one forms processing subsystem 101 and at least one client subsystem 102*a* or 102*b* configured to communicate via a network 131. The forms processing subsystem 101 may be configured to communicate with one or more back office systems 137 (e.g., up to "n" such systems as shown in FIG. 1) of one or more organizations 103 via a network 133. Further, in an embodiment, the system 100 may include more than one client subsystem 102 (e.g., up to "m" such subsystems as shown in FIG. 1). The forms processing subsystem 101 may be configured to communicate with an authentication gateway 104 using an interface 135.

As shown in FIG. 1, the forms processing subsystem 101 may include a forms designer 111, a submission module 113, a print module 115, a data repository 119, a form processing and workflow module 117, an administrator module 121, and a form catalog 139. The client subsystem 102*a* may include a form submission manager 125, a client data store 127, and a browser application 129. The client subsystem 102*b* may comprise the browser application 129. For convenience herein, common aspects of the client subsystems 102*a* and 102*b* are described with reference to the client subsystem 102. The forms processing subsystem 101 may be configured to provide data collection and processing functions such as, for example, data entry forms electronic creation and management. The forms processing subsystem 101 and the client subsystem 102 may exchange information and otherwise cooperate to create and modify forms, including content fields, formatting, and form style or look and feel, and also to generate and output completed forms. As used herein, a completed form is a form in which information has been entered and for which a user indicates data entry is complete.

In an embodiment, the client subsystem 102*a* may use prepopulation data to assist a user during the process of completing or filling out an electronic form. As used herein, prepopulation data can be information that is automatically included in one or more data entry fields of an electronic form at the time the form is output, either to a user for data entry or transfer to another computing device or system. In various embodiments, prepopulation data comprises relevant data from previous forms submissions, i.e., information already entered into a form by a user at the client subsystem 102*a* and that may be requested for entry in a subsequent form. Prepopulation data may be stored locally at the client subsystem 102*a* using, for example, the client data store 127. In an embodiment, the forms processing subsystem 101 may provide a forms data element cross-reference index to prepopulation data to the client subsystem 102*a* along with the forms related data received from the forms processing subsystem 101 upon receiving a request for a form from the client subsystem 102*a*. The client subsystem 102*a* may also provide the capability for the user to save partially completed forms (i.e., a form including data entered into one or more data entry fields of the form), as well as completed forms, locally at the client subsystem 102*a* using, for example, the client data store 127, for later retrieval and editing. In an embodiment, completed and partially completed forms may be stored as XML documents in the client data store 127. In the client data store 127, forms can be easily identified and indexed. For example, in various embodiments, forms can be stored as separate files in a specific directory, one form per file with each form represented as an XML document and filename providing a clear reference to the form it contains. In such embodiments, this organization provides means for searching data storage and retrieving additional information such as, for example, the time when the form was saved for the last time.

Figure 2:
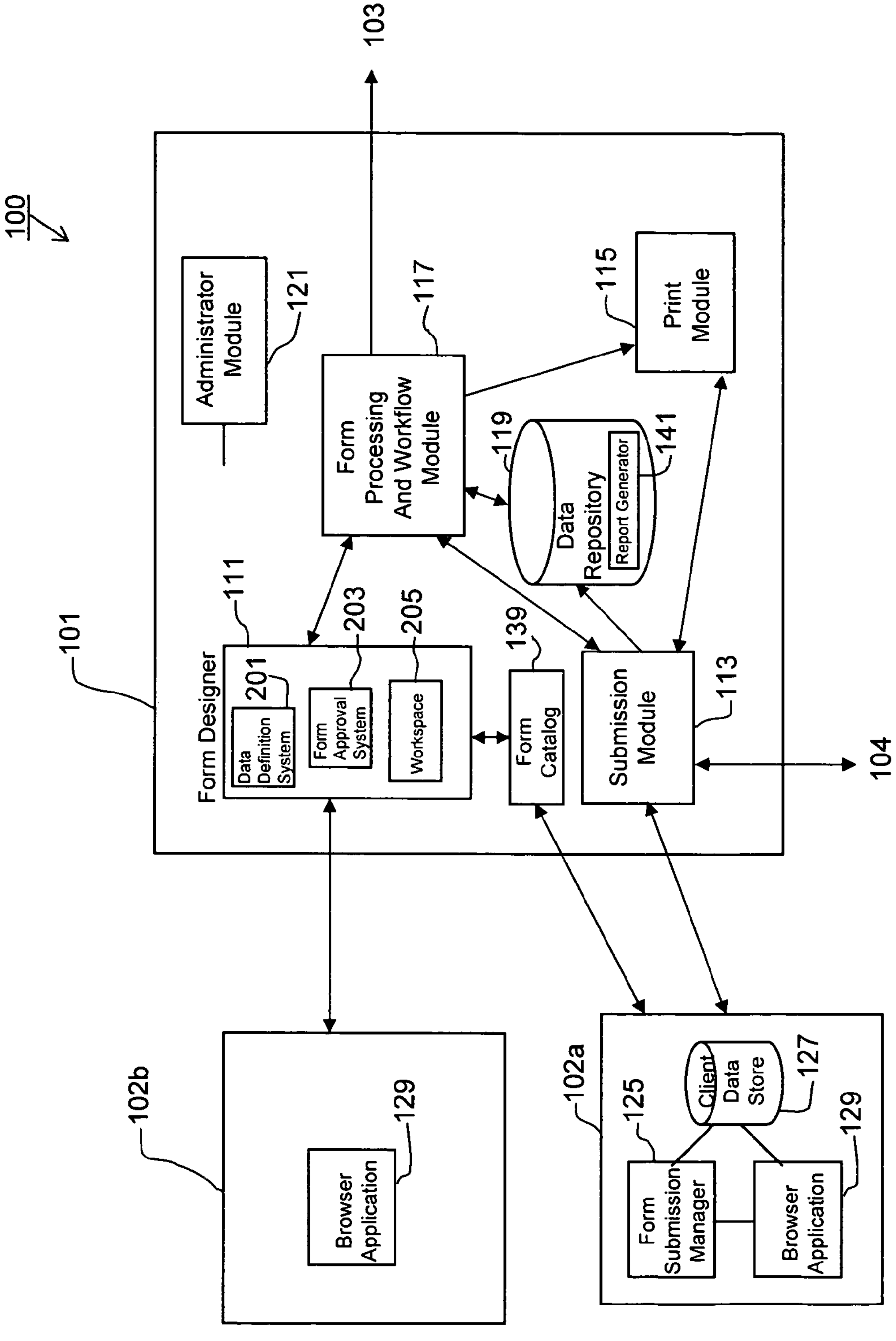
FIG. 2 is a functional block diagram of the data collection and processing system according to at least one embodiment.

With regard to FIG. 2, there is shown a functional block diagram of a data collection and processing system 100 according to at least one embodiment. The system 100 may support a variety of users who interact with the client subsystem 102 for forms processing and generation. For example, an administrative user for an organization may interact with the system 100 via the client subsystem 102*b* to create and manage one or more forms required for the organization's operations. Examples of such organizations include any government agency (federal, state, or local), or a private enterprise whose business operations require the processing of forms. Other users may include users associated with an oversight or administrative agency who interact with the system 100 via the client subsystem 102*b* to approve forms to be submitted to an organization, which may include completed forms, and who oversee or manage data collection operations for an organization. In addition, the general public may interact with the system 100 via the client subsystem 102*a* to retrieve publicly-available forms (e.g., IRS Form 1040), complete or enter data into (i.e., fill out) the forms, and submit the completed forms to an organization via the forms processing subsystem 101. Thus, in various embodiments, the system 100 may comprise at least two client subsystems for use by different types of users. A first client subsystem 102*a* may be accessed by users such as members of the general public that submit forms to the organizations 103. In various embodiments, the client subsystem 102*a* can comprise a form submission manager 125 client, the client datastore 127, and the browser application 129. The form submission manager 125 may be a software client. A second client subsystem 102*b*, or designer client subsystem, may be accessed by users such as, for example, an agency's administrator who creates forms or an oversight organization that approves forms. In various embodiments, the designer client subsystem 102*b* can comprise the browser application 129. In various embodiments, users interacting with the designer client subsystem 102*b* may interact with and store data (for example, new forms) directly using the form designer 111.

Regarding the forms processing subsystem 101, the form designer 111 may provide users the capability to quickly design, create or modify data entry forms using the client subsystem 102. As shown in FIG. 2, in an embodiment, the form designer 111 may output forms and related data to the designer client subsystem 102*b*, receive forms design selection input from the designer client subsystem 102*b*, and receive form layout and formatting rules from the data repository 119. In an embodiment, a user may request to edit or define a form using the designer client subsystem 102*b*. In response to the request, the form designer 111 may retrieve the requested form from the form catalog, if the form exists, and form related information from the data repository 119 and download the forms information to the requesting designer client subsystem 102*b*. The form designer 111 may include a Graphical User Interface (GUI) with which a user may interact, using a browser application, to create or modify one or more forms for data entry using the designer client subsystem 102*b*. The GUI may be web-based. In at least one embodiment, the GUI may comprise a workspace 205. During form design, a user can identify two workflow processes: a process of form approval before form can be available to the general public and form processing workflow after form submission by members of the public to the submission module. As used herein, members of the public refers to users including government employees who fill in or complete forms. During form design process, a user may interact with the form designer 111 (that also supports form approval workflow process) and data repository 119. Once a form design has been completed, the form designer 111 may process the new or modified form in accordance with rules specified by the form approval system 203. For example, form approval rules may require that the form be approved by multiple persons or administrators prior to release of the form for use by others such as the general public. After all approvers have indicated their approval of the new or modified form, the form designer 111 may output the approved form to the form catalog 139. The form catalog may maintain one or more approved forms that are accessible to users via the client subsystem 102*a*.

As shown in FIG. 2, in various embodiments, the form designer 111 can comprise a data definition system 201 that allows specifying data elements in a form, a workspace 205 that allows designing web form layout, and a form approval system 203 that allows defining the approval process and implementing this process through a set of roles and privileges and different types of notifications throughout specific workflow nodes. The data definition system 201 allows the user to define data element type, format, size, etc., its graphical presentation on a form (for example, text field, check box, radio button), and processing and validation rules like value, mandatory, its relation with other elements of the form, etc. This information can be made available to a user.

Figure 3:
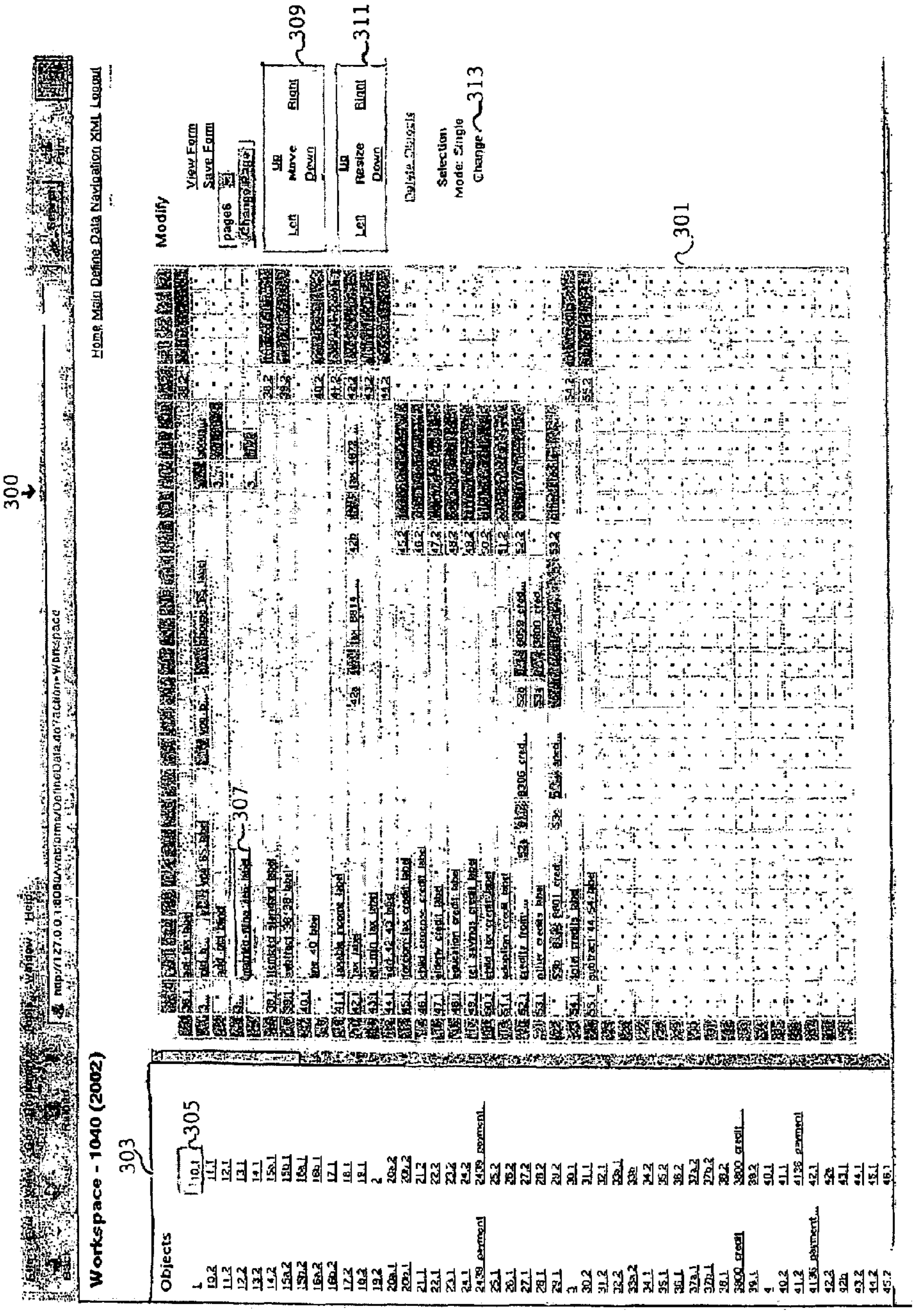
FIG. 3 is an example form workspace according to at least one embodiment.

With regard to FIG. 3, there is shown an example form workspace page 300 for workspace 203 for a tax form according to an embodiment. As shown in FIG. 3, the workspace page 300 may include a form layout grid 301 accessible using a click and drop function by which a user may specify the location of particular data entry fields 307 or other text-based information to be included in a form. To use the click and drop feature, a user may select a particular data entry field 307 by selecting, for example, using a button of a mouse device, the data entry field, then positioning a cursor at a desired location for the data entry field on the grid 301, and dropping or placing the data entry field at the desired new grid location by deselecting with the mouse button. The workspace page 300 may further include an objects index 303 containing a list of objects 305 comprising data entry fields that a user may select for inclusion on a form using, for example, the click and drop feature. In an embodiment, the workspace page 300 may also include move buttons 309 that when selected by a user cause one or more data entry fields 307 to be moved up, down, left, or right in the form layout. The workspace page 300 may also include resize buttons 311 that when selected by a user cause one or more data entry fields 307 to be resized in terms of character length, height, etc. in the up, down, left, and right directions. Whether a single data entry field 307 or more than one data entry field 307 are selected may depend on the state of the user-selectable mode selection button 313. Thus, an intuitive GUI is provided for electronic form layout by a user who does not need to possess XML/HTML or other programming skills. During form layout design the system creates data entry elements' layout in accordance with data definition in the first step. For example, the size of a text field will be equal to the number of characters define as a size for this element. Such definition information may be provided by the data definition system 201. The form designer 111 provides the capability to change initial layout by re-sizing this field for esthetic or functional purposes.

The form designer 111 may link form fields to allow form data to be shared by multiple electronic forms. For example, the form designer 111 may mark or tag a data entry field in a first form as referring to the same or similar data entry information associated with another data entry field in a second form. Any number of data entry fields and forms may be so marked. Such marked fields may be easily identified by the data repository 119 in establishing a form data element cross-reference index.

Furthermore, the form designer 111 may assign an authentication method to a form. The assigned authentication method may be defined in terms of form rules. The authentication rules may be received, for example, from an administrative user of an organization associated with the form using the designer client subsystem 102*b*. For example, an authentication method may require a digital signature (e.g., that a form be digitally signed) at time of form submission to the submission module 113 and prior to outputting the form to the organization 103.

Upon completing a modification to a form or a new form definition, the user may cause the designer client subsystem 102*b* to upload the new form and its form-related information to the form designer 111. Upon receiving the new form and its form-related information, the form designer 111 may forward the form to the form processing and workflow module 117 to verify that the new or modified form complies with form rules for the organization with which the new or modified form is associated. An organization 103 may specify a default form creation process, or a customized process, on a form-by-form basis. The form designer 111 may associate an electronic form with a PDF version of the form. The form designer 111 may then process the new or modified form in accordance with rules specified by the form approval system 203. After the new or modified form has been approved, the form designer 111 may output the approved form to the form catalog 139.

Further, the form designer 111 may output the XML schema for a form, or a sample XML instance of the electronic form, to a user at the client subsystem 102*b*. Thus, embodiments may provide the capability for a user to download the XML schema for an electronic form, or e-form, for output, editing, or data entry by the user at the client subsystem 102. The user may download an empty XML instance of the form. The client subsystem 102*b* may output the downloaded electronic form to the user using the browser application 129 via a display of the client subsystem. User input such as content editing, commands, and data entry for the form may be received using a computer mouse or keyboard or other data entry or pointing device of the client subsystem 102*a*.

In an embodiment, the capability may be provided for the user to download to the client subsystem 102 an XForms version of the electronic form. Further details regarding XForms may be obtained from various sources including from the World Wide Web Consortium (W3C) at HTTP address "www.w3.org/MarkUp/Forms."

Figure 4:
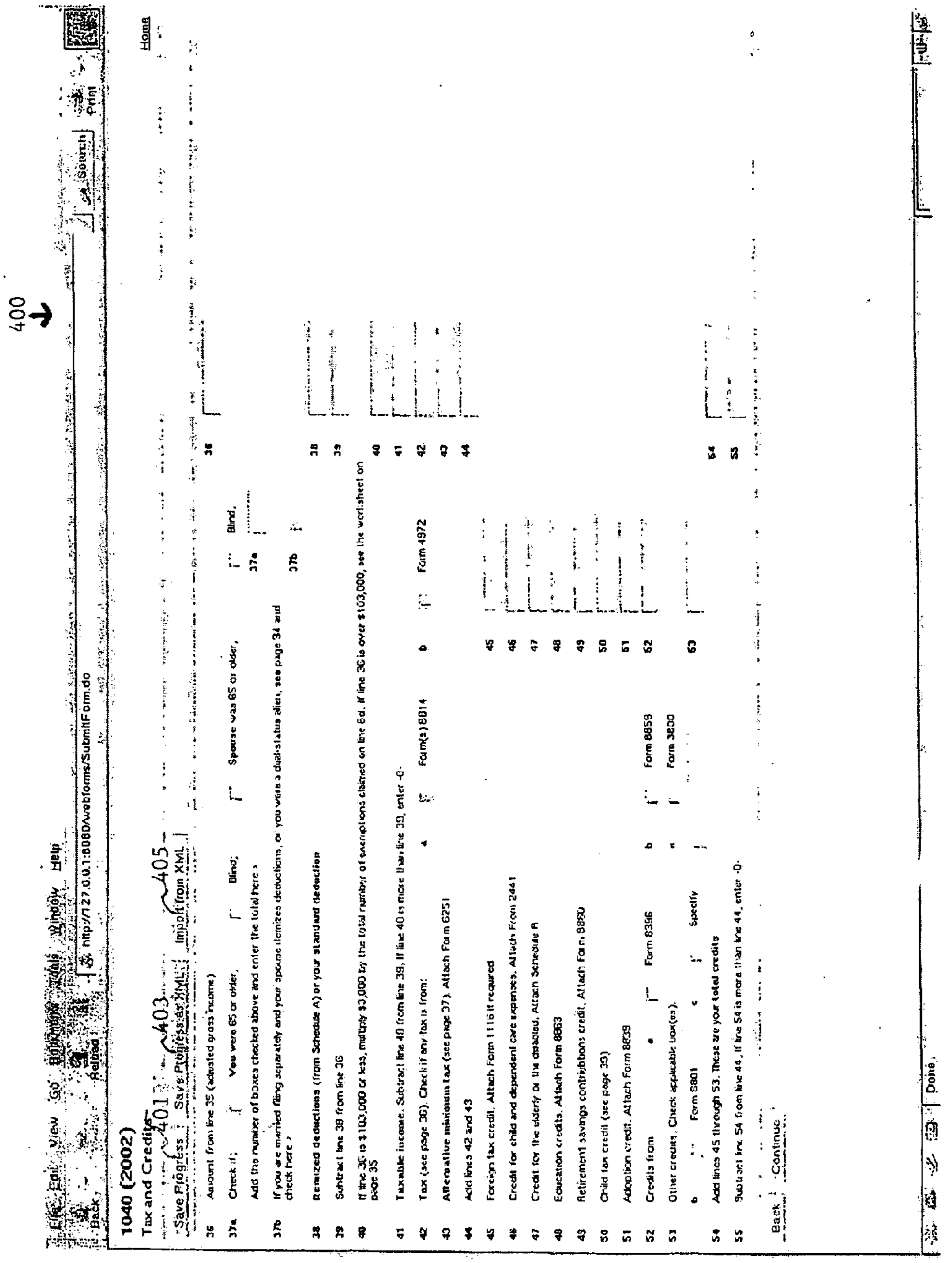
FIG. 4 is an example XML instance of an electronic form according to at least one embodiment.

Thus, the client subsystem 102 and the forms processing subsystem 101 may cooperate for forms definition and forms completion. With regard to FIG. 4, there is shown an example HTML instance of an electronic form 400 (e.g., a tax form) that may be output to a user at the client subsystem 102 using the browser application 129. User input such as editing, commands, and data entry for the form may be received using a computer mouse or keyboard or other data entry or pointing device of the client subsystem 102*a*. As shown in FIG. 4, the HTML instance of an electronic form 400 may include a Save Progress button 401, a Save Progress as XML button 403, and an Import from XML button 405. User selection of the Save Progress button 401 may cause the form submission manager 125 of the client subsystem 102*a* to locally store the current version of the form data, including population data, using the client data store 127. User selection of the Save Progress as XML button 401 may cause the form submission manager 125 of the client subsystem 102*a* to locally store the current version of the form data, including the XML schema and population data, as an XML instance using the client data store 127. Saving the form data locally minimizes privacy issues faced by an organization 103. Local storage of form versions may also reduce the memory and resource requirements for the forms processing subsystem 101. User selection of the Import from XML button 401 may cause the form submission manager 125 of the client subsystem 102*a* to retrieve a locally stored XML instance of the form data, including the XML schema and population data, from the local client data store 127.

In an embodiment, the submission module 113 may receive a completed form including form data entered or provided by a user uploaded from the client subsystem 102*a*. In various embodiments, the submission module 113 may comprise a server including form data storage capability. The submission module 113 may either store the submitted form data or output an XML instance of the form data to an organization 103 via the form processing and workflow module 117. The output form data may be transferred to, for example, one or more back office systems 137 of an organization 103. The submission module 113 may cause the user submitting the form to be authenticated as being authorized to submit the form. In various embodiments, the authentication can be performed in accordance with rules defined by an associated organization. The submission module 113 may forward or transfer the authentication request to an external system such as, for example, the authentication gateway 104, in accordance with the standards and protocols defined by the organization 103 associated with the form. For example the submission module 113 may output an authentication request to the authentication gateway 104 using, for example, the interface 135. Provided authentication is successful, the submission module 133 may route the uploaded form to one or more recipients according to the rules and contact information associated with the form that is stored in the form processing and workflow module 117. Furthermore, the submission module 113 may output the forms to recipients using one or more interfaces such as, for example, Web Services specifications established by the Organization for the Advancement of Structured Information Standards (OASIS), FTP, or electronic mail. In addition, the submission module 113 may process an uploaded form according to workflow rules stored using, for example, the data repository 119 and enforced by the form processing and workflow module 117. These rules may define various aspects of form processing such as, for example, push or pull workflow, multiple recipients, dependencies, or due dates.

In an embodiment, the submission module 113 may be configured to obtain authentication of a submitted form using an external authentication system such as, for example, the authentication gateway 104 upon receiving a completed form from the client subsystem 102*a*. The authentication gateway 104 may be an external system provided by or used by an organization 103 to verify the authenticity of users and the information submitted by them. In an embodiment, form related data includes, for each form, an identification of the type of authentication to be required. For example, authentication mechanisms may include, for example, but not limited to, a password, a Personal Identification Number (PIN), or biometric verification. In an embodiment, the submission module 113 may be configured to exchange information with the authentication gateway 104 using the network 135. In such embodiments, the forms processing subsystem 101 and the authentication gateway 104 may exchange information securely using, for example, the SSL secure data transfer protocol. Thus, organizations 103 may define the authentication process applied to forms generated using the system 100. The system 100 allows the user to obtain authentication or verification directly without having to go through a centralized process, which results in faster authentication and overall forms processing.

In an embodiment, the forms designer 111 and the submission module 113 may generate and transmit forms and form-related information in the form of interactive HTML pages to the client subsystem 102 via the network 131. In particular, the forms designer 111 or the submission module 113 may receive requests for forms information as well as user entered data received from the client subsystem 102. Such user provided requests and data may be received in the form of user entered data contained in an interactive HTML page provided in accordance with the Java Server Pages™ standard developed by Sun™ Microsystems. Alternatively, user provided requests and data may be received in the form of user entered data contained in an interactive HTML page provided in accordance with the Active Server Pages (ASP) standard. In response to a user entered request, the forms designer 111, form catalog 139, or the submission module 113 may output the requested information, which may be a form, as an interactive HTML page by obtaining forms data or forms-related data (e.g., metadata) corresponding to the user request by transmitting a corresponding command to the data repository 119 requesting retrieval of the associated data. The data repository 119 may then execute one or more scripts to obtain the desired information and provide the retrieved data to the requesting module. Upon receipt of the requested data, the forms designer 111 or submission module 113 may build an interactive HTML page including the requested data and transmit the page to the requesting client subsystem 102 in accordance with, for example, XML and Java Server Pages™ (JSP) formatting standards.

In an embodiment, the print module 115 may comprise an interface to a printed forms generator application such as, for example, but not limited to, the Adobe Acrobat™ Portable Document File™ (PDF) application available from Adobe Systems, Inc. of San Jose, Calif. The print module 115 may output form data, including populated data entry values, to the forms generator application in a format suitable for the forms generator application to output a printed form. In an embodiment, an XML version of the form may be associated with a PDF document. This association may be maintained or stored using the form catalog 139. The print module 115 may obtain the XML to PDF association information from the form catalog 139 and output form data to the forms generator application based on this association. Embodiments may thus provide the capability to output printed forms through an interface to a forms generator application. A user at a client subsystem 102 may send a request for the associated PDF form to the print module 115 that includes data populated into the electronic version of the form by the user. The print module 115 may in response download to the user at the client subsystem 102 a PDF version of the form for output via display or printer device.

In an embodiment, the form processing and workflow module 117 may provide form processing according to one of two modes of operation. In a pass-through mode, the form processing and workflow module 117 may forward the completed form uploaded from the client subsystem 102 to one or more associated organizations 103 without checking the form layout and contents for rules compliance. In this mode, the form and its tagged data are simply formatted for transfer to the associated organization 103 in the interface format required by the organization 103. In this mode, user entered data is not persistently maintained using the forms processing subsystem 101, but rather is transferred to the associated organization 103. In this mode, authentication information may be may be output to a point of contact for an organization 103. Also in the first mode, the form processing and workflow module 117 may parse the content of forms and output different portions of forms to different parts of an organization (e.g., transfer different parts of forms to different back office systems 137 of an organization 103).

In a second mode, or verification mode, the form processing and workflow module 117 may store the forms information and make it accessible to the corresponding organization(s). In this second mode, the form processing and workflow module 117 may control the processing performed by the forms processing subsystem 101 to ensure compliance with forms rules. The form processing and workflow module 117 may include rules for automatic electronic form generation from XML schema. The rules may also provide integrated version control for forms. The rules may also specify the form approval process. Furthermore, the rules may allow collaborative definition and design of forms by different users of the same or of different organizations. The rules may be maintained or stored using the data repository 119. In an embodiment, for each form the rules may be defined by the organization 103 associated with the form. An administrative user for an organization may define the rules using the designer client subsystem **102*b* and upload rules additions or modifications to the forms processing subsystem 101 via the form designer 111. Thus, the electronic versions for an organization 103 may be maintained current or kept up-to-date for use with the system 100. Forms-related data or information may also be maintained using the data repository 119 and updated by an administrative organization user. Such forms-related information may include form filing instructions and contextual help information to be made available to a user along with the form itself when downloaded to the requesting client subsystem 102. The mode in which the form processing and workflow module 117** operates may be determined on a form-by-form basis according to rules provided by the organization, or by user selection from a user having the authority to decide the mode.

The data repository 119 may also be configured to provide metadata administration functions. For example, the data repository 119 may establish a form data element cross-reference index and store metadata of the forms and individual elements, and provide elements' cross-references within the form and between different forms. To establish the cross-reference index, the data repository 119 may define common data elements appearing in different electronic forms. The forms may be associated with the same organization 103 or with different organizations 103. The forms may be identified using the form catalog 139. The common data elements in the cross-reference index may be used to identify and retrieve prepopulation data. For example, data already entered by a user for a previous version of the form or for a different form that has the same or a similar data element can be retrieved and used to populate the form when it is requested by a user for edit or completion. The prepopulation data may be retrieved and entered into an XML based form prior to outputting the form to a user for editing or data entry/completion of the form.

Figure 7:
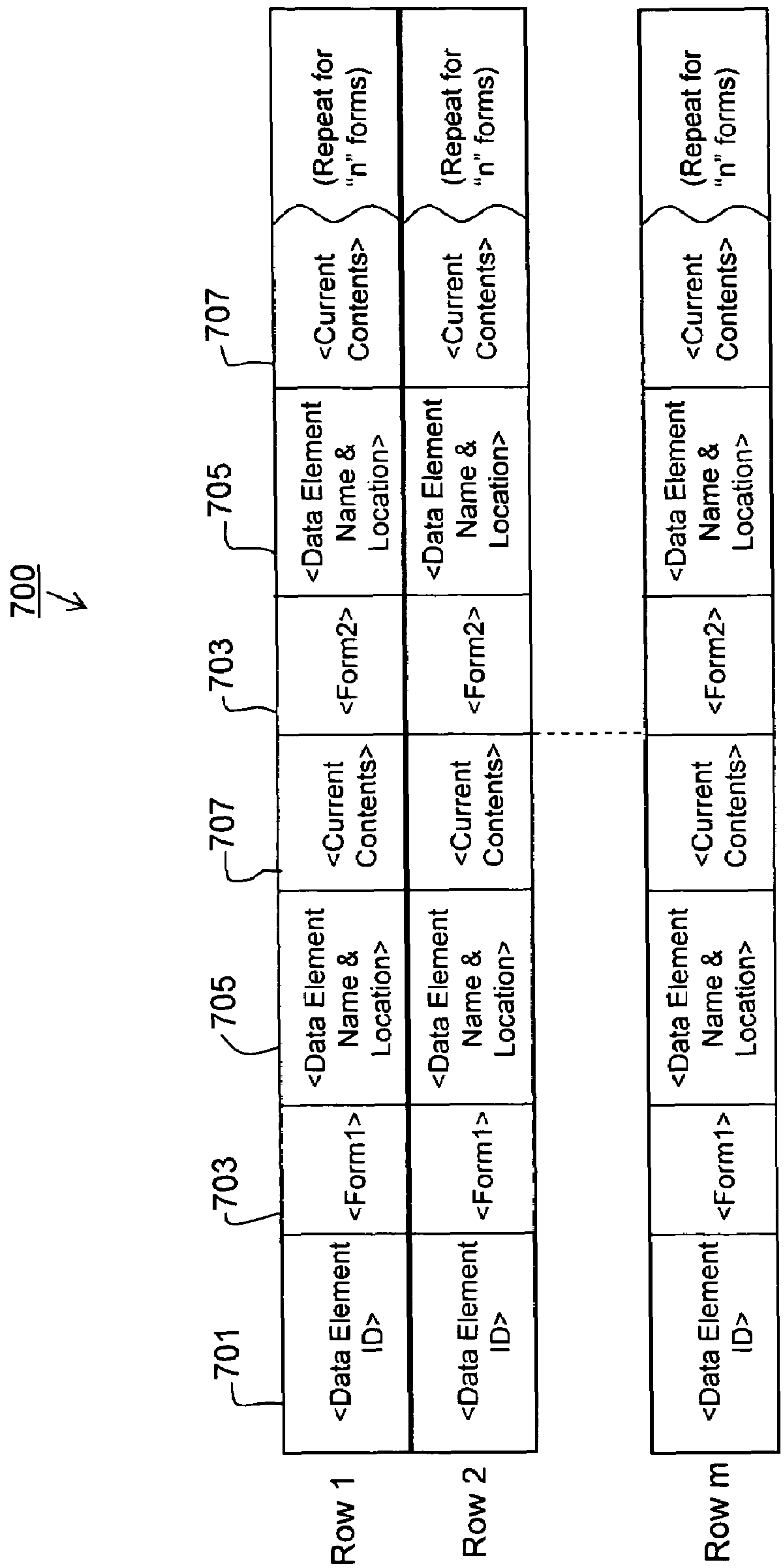
FIG. 7 is an example form data entry cross-reference index according to an embodiment.

FIG. 7 is an example form data element cross-reference index 700 according to an embodiment. As shown in FIG. 7, a form data element cross-reference index 700 may include an optional data element Identifier (ID) 701 to identify a particular data element, a form indicator 703 to identify the form in which the data element is found, a data element name & location field 705 to identify the name of the data element as it is known in the associated form and, optionally, its location in the form. The location may be, for example, form grid coordinates. The form data element cross-reference index 700 may further include a field for listing the current contents 707 of the data element in the form. Fields 703, 705, and 707 may then be repeated for one or more forms up to "n" forms that include the same or similar data element. The cross-reference index 700 may include multiple such common data elements (shown as up to "m" rows in FIG. 7). As discussed above, the form data element cross-reference index 700 may be used by the data repository 119 to identify prepopulation data. The form data element cross-reference index 700 may also be used for analysis to identify and report consolidation opportunities within and among forms. The form data element cross-reference index 700 may also be used as an enterprise-wide cross-reference data dictionary through which different organizations or agencies may communicate with each other. Further, the form data element cross-reference index 700 may be used for data integrity verification across organizations.

In an embodiment, the identified prepopulation data may be output to a requesting client subsystem 102 as forms-related data along with the form downloaded to the client subsystem 102 upon user request. However, the data repository 119 may provide further processing using the metadata contained in, for example, form data element cross-reference index 700. For example, the data repository 119 may identify forms for consolidation by analyzing the form data entry cross-reference index 700 to identify different forms that contain a significant number of the same or similar data elements. This consolidation analysis may be performed for forms within an organization or for forms across multiple organizations. For purposes including the consolidation analysis, the data repository 119 may comprise a report generator 141 configured to generate and output one or more reports. For example, the report generator 141 may generate and output a similar data elements report listing one or more data elements appearing in different forms that require the same or similar information or data. FIG. 11 is an example similar data elements report 1100 in accordance with various embodiments. In addition, the report generator 141 may generate and output a cross reference counts report indicating the number of times the same or similar data elements appear in different forms. FIG. 12 is an example cross reference counts report 1200 in accordance with various embodiments. Further, the report generator 141 may generate and output a data elements catalog report listing all, or a select subset of, the data elements appearing in one or more forms. FIG. 13 is an example data elements catalog 1300 in accordance with various embodiments. These and other reports provided by the system 100 may be useful for identifying consolidation and reconciliation opportunities among the forms of an organization or among forms across multiple organizations in order to increase efficient use of resources and eliminate redundant forms and their attendant operations and costs. In addition, reports may be generated and output to identify data dependencies.

In addition to the data repository 119, in various embodiments, each of the form designer 111, submission module 113, print module 115, form processing and workflow module 117, administrator module 121, or form catalog 139 may store forms information or forms related information that can be retrieved and provided to the requesting module. Data and metadata maintained or stored by the forms processing subsystem 101 may include, without limitation, form rules, form XML schema information, forms-related data, the forms data element cross-reference index (in the data repository 119), and an indication for each electronic form of an associated Portable Document File™ (PDF) formatted form. The organization-defined rules may identify milestones associated with forms preparation and submission, organization interface information (e.g., organization point of contact, IP address or URL to use, whether to use FTP or HTTP, etc., electronic mail addresses for points of contact), and an indication of how often forms may be uploaded. These rules, and other such forms-related data, may be downloaded to the client subsystem along with, or at the time of, download of requested form to a user at a client subsystem 102.

In an embodiment, the data repository 119 and the form catalog 139 may comprise a database management system (DBMS) software application such as the PostgreSQL by the PostgreSQL Global Development Group, the source code for which is publicly available from various sources including the World Wide Web at, for example, www.postgresql.org, for storage and retrieval of, for example, forms data in accordance with the Structured Query Language (SQL) database format. Alternatively, the data repository 119 or form catalog 139 may be implemented using SQL Server provided by Microsoft Corporation, or similar products provided by Oracle® Corp. of Redwood Shores, Calif. or the open source MySQL®. The data repository 119 and form catalog 139 may execute a sequence of SQL scripts operative to store or retrieve particular items arranged and formatted in accordance with a set of formatting instructions. For instance, the data repository 119 or form catalog 139 may execute one or more SQL scripts in response to a request for particular items of forms data.

The administrator module 121 may provide administrative functions for the system 100 such as, for example, defining an access level for a user of the system 100. Various access levels or permissions may be provided. For example, one access level may permit a user data entry or form completion privileges only. Another access level (e.g., "form creator") may permit a user to define entirely new forms for an organization. Yet another access level (e.g., "form approver") may permit a user to approve forms created or modified by other users. Yet another access level (e.g., "data administrator") may permit a user to review and consolidate data entry forms for an organization. Yet another access level (e.g., "cross-reference administrator") may permit a user to view forms from multiple agencies or organizations for compliance with common standards (e.g., government specifications), or to identify opportunities for enterprise wide efficiencies or consolidation among multiple organizations. Although not shown in FIG. 2, the administrator module 121 may comprise interfaces to one or more of the other elements of the forms processing subsystem 101.

In an embodiment, the client subsystem 102 (either the client subsystem 102*a* or the designer client subsystem 102*b*) may be implemented using a Personal Computer (PC) such as a PC workstation, mobile PC or laptop PC, or a tablet PC, a cellular telephone, a Personal Digital Assistant (PDA), a Blackberry™ device, a pager, a Wi-Fi device, a Bluetooth™ enabled device, a radio receiver, or other such browser-enabled device. The client subsystem 102*a* may include a form submission manager 125 for downloading or receiving forms and information related thereto from the forms processing subsystem 101 and for uploading populated forms to the forms processing subsystem 101 via the network 131. The designer client subsystem 102*b* may include a browser application 129 for downloading or receiving form design information or data from the forms processing subsystem 101 and for uploading new or modified forms to the forms processing subsystem 101 via the network 131. In various embodiments, the form submission manager 125 may be implemented as a sequence of programmed instructions that when executed by a processor, such as a PC, cause the processor to be configured to perform functions as described herein. For example, in an embodiment, the form submission manager 125 may be implemented as a Java™ applet that includes a sequence of Java™ instructions. The form submission manager 125 may be executed by the browser application 129 of the client subsystem 102 to perform the client subsystem 102 functions described herein. The client subsystem 102*a* may also include a client data store 127 provided in communication with the form submission manager 125 for locally storing forms data and content entered at the client subsystem 102*a* and also prepopulation data to be entered using the client subsystem 102*a*. The client data store 127 may be a hard disk device internal to a PC. Alternatively, the client data store 127 may be a hard disk or other storage device connected to and accessible by a PC using a LAN or cable. The client subsystem 102 may also include various applications such as, for example, an electronic mail application for receiving electronic mail messages in accordance with, for example, the Post Office Protocol (POP/POP3).

The client subsystem 102 may also include the browser application 125 capable of transmitting and receiving and displaying HyperText Markup Language (HTML) information in accordance with the HyperText Transfer Protocol (HTTP) using the network 131. For example, the client subsystem 102 may include the Netscape Navigator™ browser application available from the Netscape Corporation of Mountain View, Calif. Other browser applications may be used, including without limitation, Microsoft Internet Explorer™. In at least one embodiment, the client subsystem 102 may be implemented using, for example, a web-enabled PC provided with the capability to receive and display graphical user interfaces included on, for example, HyperText Markup Language (HTML) formatted or Extensible HyperText Markup Language (XML) formatted pages, private network (e.g., intranet) pages, etc., provided in accordance with, for example, HyperText Transport Protocol (HTTP) as well as the capability to transmit and receive electronic mail messages in accordance with Simple Mail Transport Protocol (SMTP) and files in accordance with the File Transfer Protocol (FTP). Thus, an embodiment of the client subsystem 102 may include a personal computer having a network connection or interface, such as a dial-up modem or Digital Subscriber Line (DSL) connection to a network.

In an embodiment, the networks 131, 133, and 135 may be packet-switched networks. For example, one or more of the networks 131, 133, and 135 may be a Transmission Control Protocol/Internet Protocol (TCP/IP) network. In at least one embodiment, the networks 131, 133, and 135 may be public networks such as, for example, the Internet. Alternatively, the networks 131, 133, and 135 may be, but are not limited to, telephone landline based modem or a wireless network such as a cellular digital packet data (CDPD) network or a wireless local area network (LAN) provided in accordance with, for example, the IEEE 802.11 standard, Global System for Mobile communications (GSM) Generalized Packet Radio Service (GPRS), an optical communications network, or other such communications network capable of transporting packet-based information. Other networks may also be used.

In operation, a user may cause the client subsystem 102 to request a form to fill out or complete or request a form to edit (for an administrative user) from the forms processing subsystem 101, or to take another form-related operation, depending upon the user's access permissions. Upon receiving the request for a form (or form-related operation) from the client subsystem 102, the forms processing subsystem 101 may retrieve and download the requested form(s) to the requesting client subsystem 102. In an embodiment, the downloaded forms and forms-related information may be transferred from the forms processing subsystem 101 to the client subsystem 102 as an XML-formatted page via the network 131.

Figure 5:
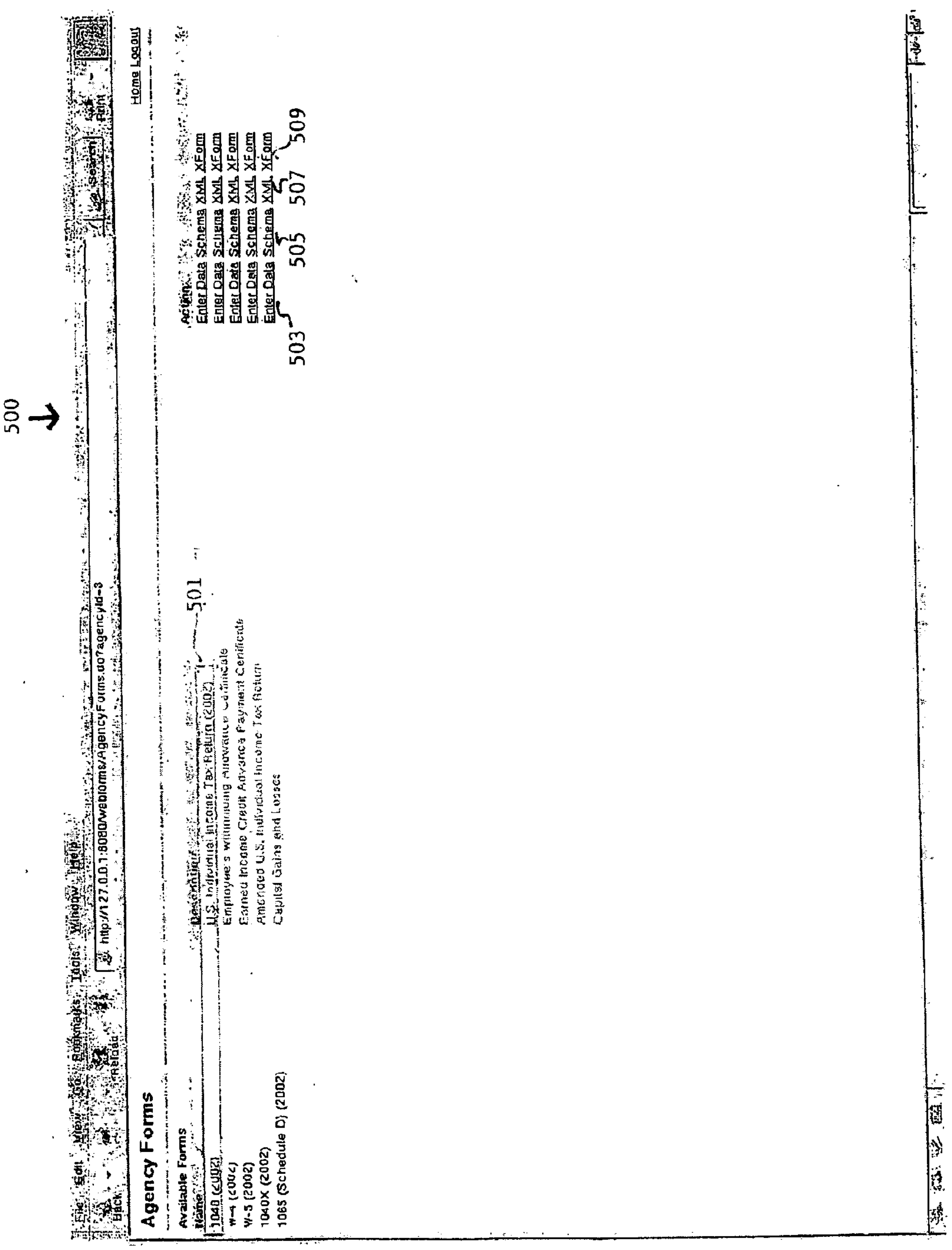
FIG. 5 is an example forms catalog page according to at least one embodiment.

With regard to FIG. 5, there is shown an example forms catalog page 500. As shown in FIG. 5, the forms catalog page 500 may comprise a list of links to forms available to a user at a client subsystem 102*a* from the form catalog 139. Each of the form entries 501 in the forms catalog page 500 may comprise a link to a form stored using the form catalog 139. Forms associated with the entries 501 may be initially downloaded from the form designer 111 of the forms processing subsystem 101. After initial download by a client subsystem 102*a*, data entered into the forms associated with the entries 501, as well as any modifications to the forms or data entered into the forms, may be stored locally using the client data store 129. As shown in FIG. 5, a user may interact with the forms catalog page 500 to perform processing of a form associated with an entry 501. For example, user selection of the Enter Data link 503 may cause the form submission manager 125 to retrieve the form associated with the selected entry 501 and output the form in a data entry mode (such as the page 400 shown, for example, in FIG. 4). User selection of the Schema link 505 may cause the form submission manager 125 to retrieve the form associated with the selected entry 501 and output the XML schema for the form to the user via a display. User selection of the XML link 507 may cause the form submission manager 125 to retrieve the form associated with the selected entry 501 and output the XML version of the form. User selection of the XForm link 509 may cause the form submission manager 125 to retrieve the form associated with the selected entry 501 and output the XForm version of the form.

In an embodiment, the client subsystem 102*a* may also provide the capability to edit forms and enter data into forms in an offline state. That is, the form submission manager 125 may allow the user to retrieve stored forms and form-related data from the local client data store 129, edit or modify the retrieved form, or enter data into data fields of the form, and then save the changes or additions to the form or form data using the client data store 129, all without a session or active communication taking place between the client subsystem 102*a* and the forms processing subsystem 101. Subsequent to offline forms editing or data entry, the user may establish an online connection with the forms processing subsystem 101 and upload one or more completed forms. Thus, forms can be completed or filled out offline with progress saved for later submission. In an embodiment, the client subsystem 102*a* may submit electronic forms to the submission module 113 via Secure Socket Layer (SSL) upon a connection or session being established with the forms processing subsystem 101. The client subsystem 102*a* may provide for the digital signature of a form prior to its submission. In various embodiments, the form submission manager 125 may be a browser-based Java applet. The form submission manager 125 may be implemented using a relatively small number of instructions to allow use of the form submission manager 125 on a wide variety of computing devices having limited resources. For example, the form submission manager 125 may require less than 150 Kilobytes of memory to store its instructions.

Referring to FIG. 1, the forms processing subsystem 101 may provide a single point interface for forms upload to an organization 103 from multiple users. In various embodiments, the forms processing subsystem 101 may be coupled to one or more back office systems 137 of an organization 103. An example of an organization is the U.S. Internal Revenue Service (IRS). The system 100 may interface to other public or private organizations. Organizations 103 may also include centralized management organizations such as, for example, the U.S. Office of Management and Budget (OMB) for review of forms processing operations of multiple other organizations or agencies. Another example organization 103 is the U.S. General Services Administration (GSA) that may provide XML definitions and/or Document Type Definition (DTD) for forms to be used by GSA and other agencies or organizations. A DTD states what tags and attributes are used to describe content in an HTML document, where each tag is allowed, and which tags can appear within other tags. The forms processing subsystem 101 may be coupled to multiple organizations 103 for forms processing. The forms processing subsystem 101 may exchange information with a back office system 137 via the network 133. In an embodiment, the forms processing subsystem 101 may exchange information with the back office systems 137 via HTTP formatted pages, FTP formatted file transfer, or SMTP message transfer.

In various embodiments, form information can be delivered to the organization back-office systems 137 by either the forms processing subsystem 101 initiating a connection with an organization-designated computer and, after automatic login, outputs the information to this computer (in other words, the system 100 "pushes" the information to the organization 103, or the organization 103 may automatically or manually login into the forms processing subsystem 101 and retrieve their information (in other words, the organization 103 pulls information out).

In various embodiments, the client subsystem 102*a* may be configured to attach a digital signature to a form when it is submitted to the submission module 113. For example, a user may be assigned a private key for use in generating a digital signature using the client subsystem 102*a*. The digital signature may be transferred to the submission module 113 along with the form data. The client subsystem 102*a* supports redirection for obtaining the digital signature.

Figure 6:
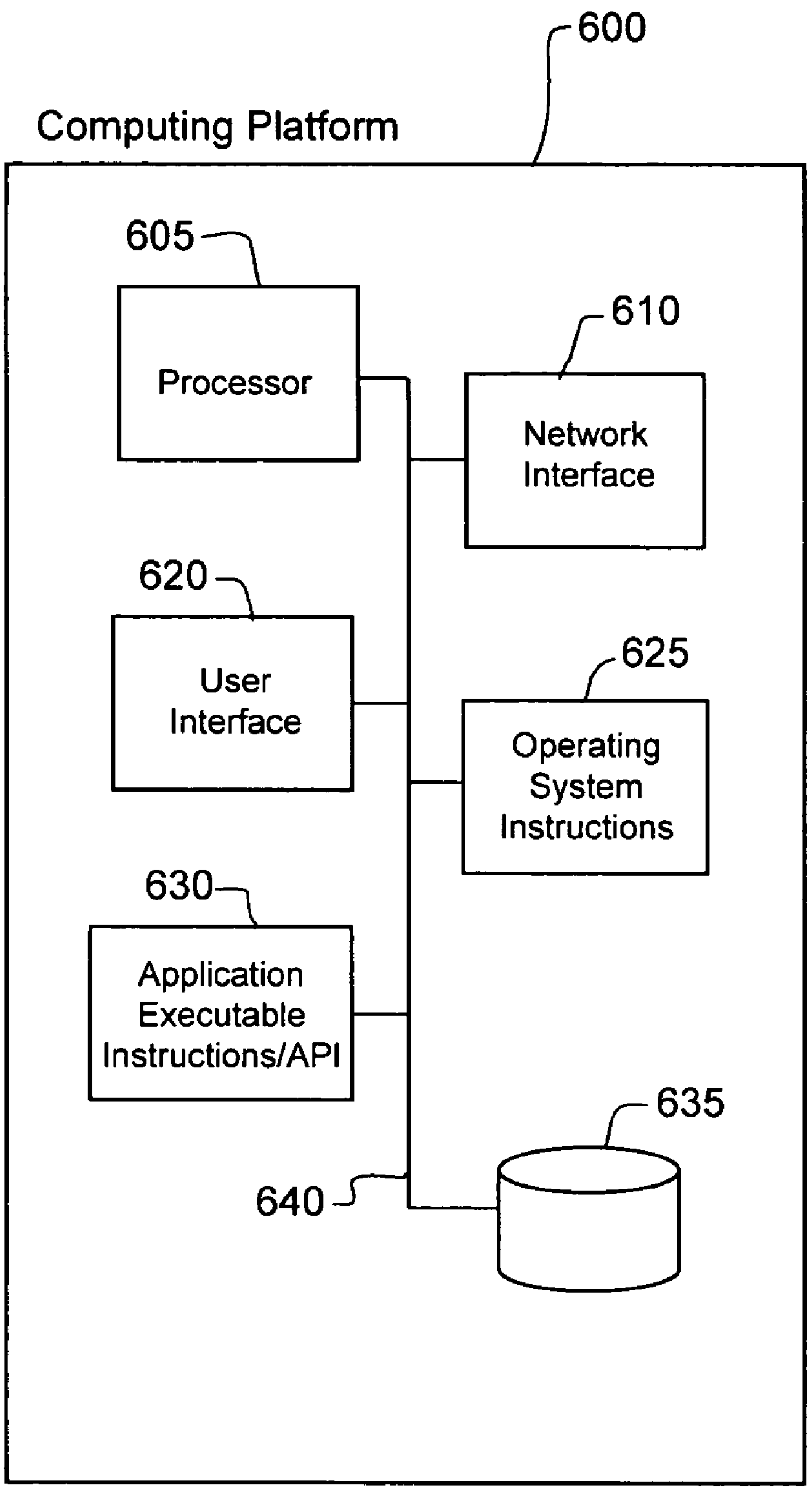
FIG. 6 is a functional block diagram of an embodiment of a computing platform.

The forms processing subsystem 101 including form designer 111 (and its modules 201, 203, and 205) and the modules 113, 115, 117, and 121, as well as client subsystem 102*a* including the form submission manager 125, and browser application 129, may be implemented in the form of application software, or a sequence of programmed instructions, executing on at least one computing platform. The data repository 119, form catalog 139, and the client data store 127 may also comprise application software along with, and configured to provide access to, a memory or storage device and that execute on at least one computing platform. FIG. 6 is a functional block diagram of one embodiment of a computing platform 600 useful for hosting such software application programs. Other computing devices may be used, as discussed earlier herein. The application software when executed by a processor of the computing platform 600 may cause the computing platform(s) to be configured to perform the functions described herein. As shown in FIG. 6, the computing platform 600 may include a processor 605, a network interface 610, a user interface 620, operating system instructions 625, application executable instructions/API 630, and a non-volatile storage medium 635, all provided in functional communication using a data bus 640. The processor 605 may be any microprocessor or microcontroller configured to execute software instructions implementing the functions described herein. Application executable instructions/APIs 630 and operating system instructions 625 may be stored using computing platform 600 non-volatile memory 635, and then loaded into volatile memory for execution. Application executable instructions/APIs 630 may include software application programs implementing forms processing subsystem 101 including form designer 111 and the modules 113, 115, 117, and 121, as well as the form submission manager 125 of the client subsystem 102*a*, browser application 129, and software portions of the data repository 119, form catalog 139, and the client data store 127. Operating system instructions 625 may include software instructions operable to control basic operation and control of the processor 605. In one embodiment, operating system instructions 625 may include the Linux operating system available from, for example, Redhat Systems, Inc. of Raleigh, N.C. Other embodiments are possible. For example, Windows™ operating system available from Microsoft Corporation of Redmond, Wash. or the NT™ operating system available from Microsoft Corporation may be used. In at least one embodiment, the computing platform may be a PC provided by Dell Computer of Round Rock, Tex.

Application programs implementing forms processing subsystem 101 including form designer 111 and the modules 113, 115, 117, and 121, as well as the form submission manager 125 of the client subsystem 102*a*, browser application 129, and software portions of the data repository 119, form catalog 139, and the client data store 127, may each reside on a single computing platform 600, or on more than one computing platform 600, or each application may reside on a separate computing platform 600. In an embodiment, the forms processing subsystem 101 may be scaleable such that additional form designers 111 and/or modules 113, 115, 117, and data repository 119 or form catalog 139 may be added to the forms processing subsystem 101 as required to increase capacity, speed, or number of users or organizations served, or to maintain system 100 capabilities as users increase. Application executable instructions/APIs 640 and operating system instructions 635 are loaded into one or more allocated code segments of computing platform 600 volatile memory for runtime execution. In various embodiments, computing platform 600 may include 512 Megabytes of volatile memory and 80 Gigabytes of nonvolatile memory storage.

In various embodiments, application executable instructions/APIs 640 may be implemented as a sequence of Java instructions in an applet. Other embodiments are possible. For example, the application executable instructions/APIs 640 may be implemented as a sequence of Visual Basic™ or C/C++ instructions. Application executable instructions/APIs 640 may include one or more application program interfaces (APIs). The forms processing subsystem 101 and client subsystem 102 application programs may use APIs for inter-process communication and to request and return inter-application function calls. For example, an API may be provided in conjunction with the client data store 127, form catalog 139, or data repository 119 in order to facilitate the development of SQL scripts useful to cause the client data store 127, form catalog 139, or data repository 119 to perform particular data storage or retrieval operations in accordance with the instructions specified in the script(s). In general, APIs may be used to facilitate development of application programs which are programmed to accomplish the messaging functions described herein, such as the addition of new modules and integration with third party products.

Returning to FIG. 6, the network interface 610 may provide the computing platform 600 the capability to transmit and receive information over the Internet, including but not limited to electronic mail, XML pages, and file transfer capabilities. To this end, the network interface 610 may further include a web browser such as, but not limited to, Netscape Navigator™ or Microsoft Internet Explorer™. The user interface 620 may include a computer terminal display, keyboard, and a pointing device such as a mouse device. One or more Graphical User Interfaces (GUIs) also may be included to provide for display and manipulation of data contained in interactive HTML pages. The user interface 620 may be browser based such, for example, but not limited to, the Netscape Navigator™ browser. The browser application may be, for example, but not limited to, web-based.

In various embodiments, users may interact with the system 100 via the client subsystem 102. For example, the user may, using the user interface of the client subsystem 102, search the forms processing subsystem 101 for a particular form; receive a form downloaded from the forms processing subsystem 101 in response to a request; receive forms-related data from the forms processing subsystem 101 such as, for example, the forms data entry cross-reference index; submit a form (e.g., a completed form) to the forms processing subsystem 101 via the submission module 113; fill out or complete a form from an archived or stored version of the form or a related form; fill in missing information into a partially completed form, which may be a saved partially completed form; modify prepopulated data in the form; electronically sign a form, if required; and save a for locally in XML format.

To access the system 100, in an embodiment, a user may enter the Uniform Resource Locator (URL) associated with the forms processing subsystem 101 into the address line of the browser application 129, which may be a World Wide Web browser application. Alternatively, a user may select an associated hyperlink contained on an interactive page using a pointing device such as a mouse or via keyboard commands. This may cause an HTTP-formatted message to be transmitted from the forms processing subsystem 101 to the client subsystem 102 (after Internet domain name translation to the proper IP address by an Internet proxy server) requesting the form. In an embodiment, the forms processing subsystem 101 may download the form to the requesting client subsystem 102 as an XML page. In response, the form designer 111 may establish a session and generate and transmit a corresponding interactive HTTP-formatted XML page to the requesting client subsystem 102. The HTML page may include data entry fields in which a user may enter information into the form. The user may enter the prompted information into the appropriate data entry fields of the HTML page and cause the terminal to transmit the entered information via interactive XML page to the form designer 111, submission module 113, or print module 115.

Figure 8A:
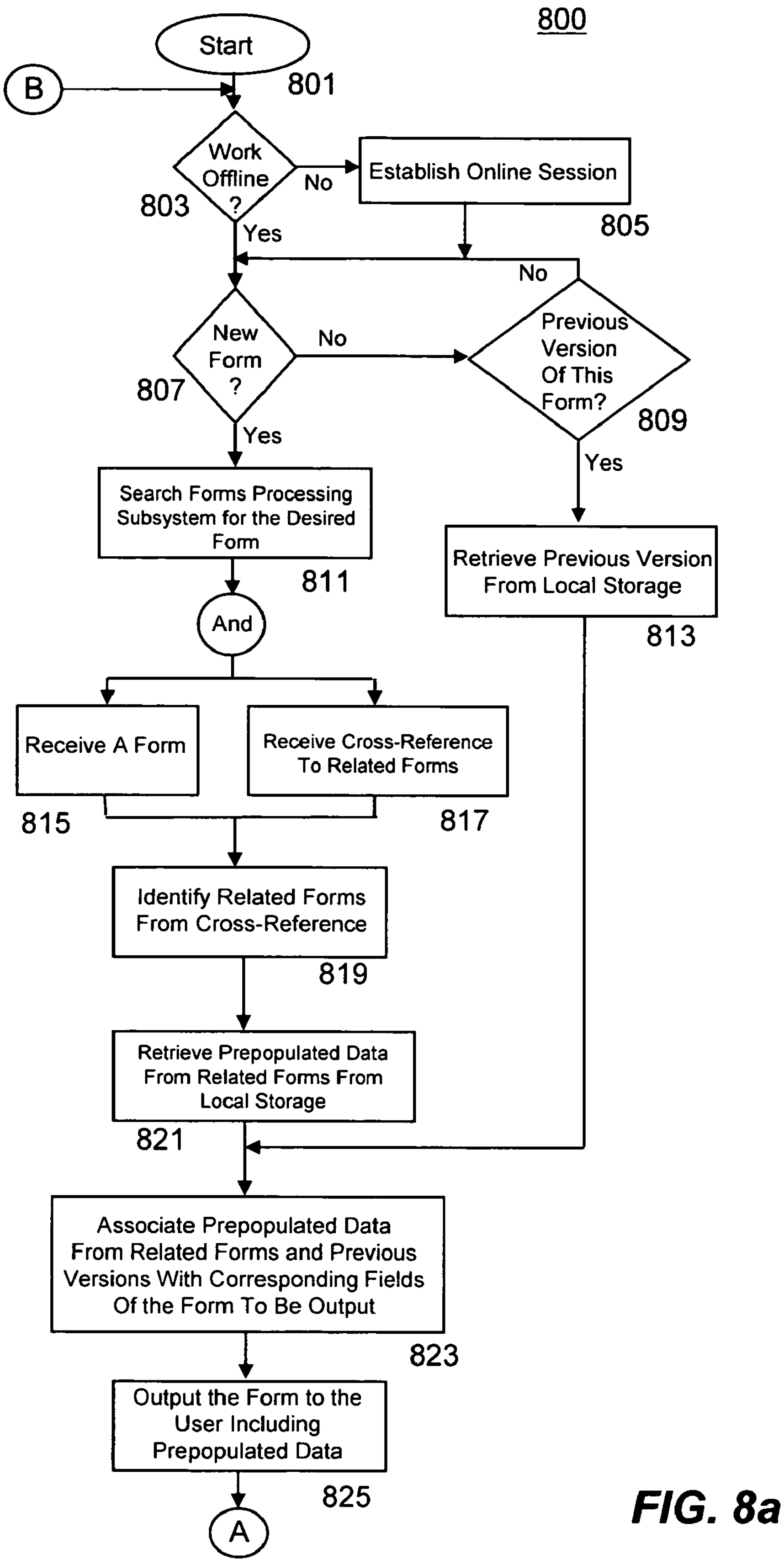
FIGS. 8*a* through 8*c* are a flow chart of a form submission processing method according to at least one embodiment.
Figure 8B:
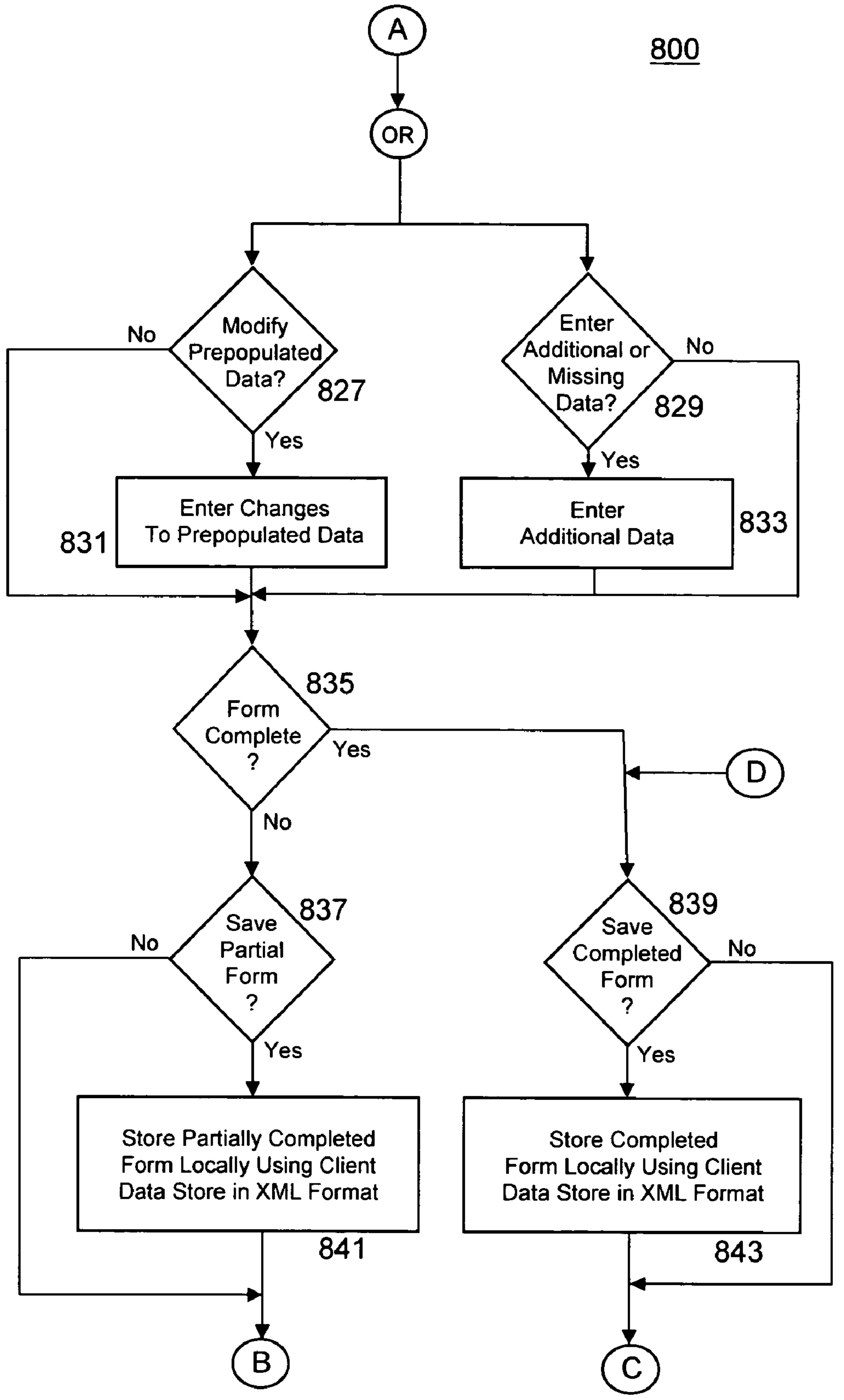
Figure 8C:
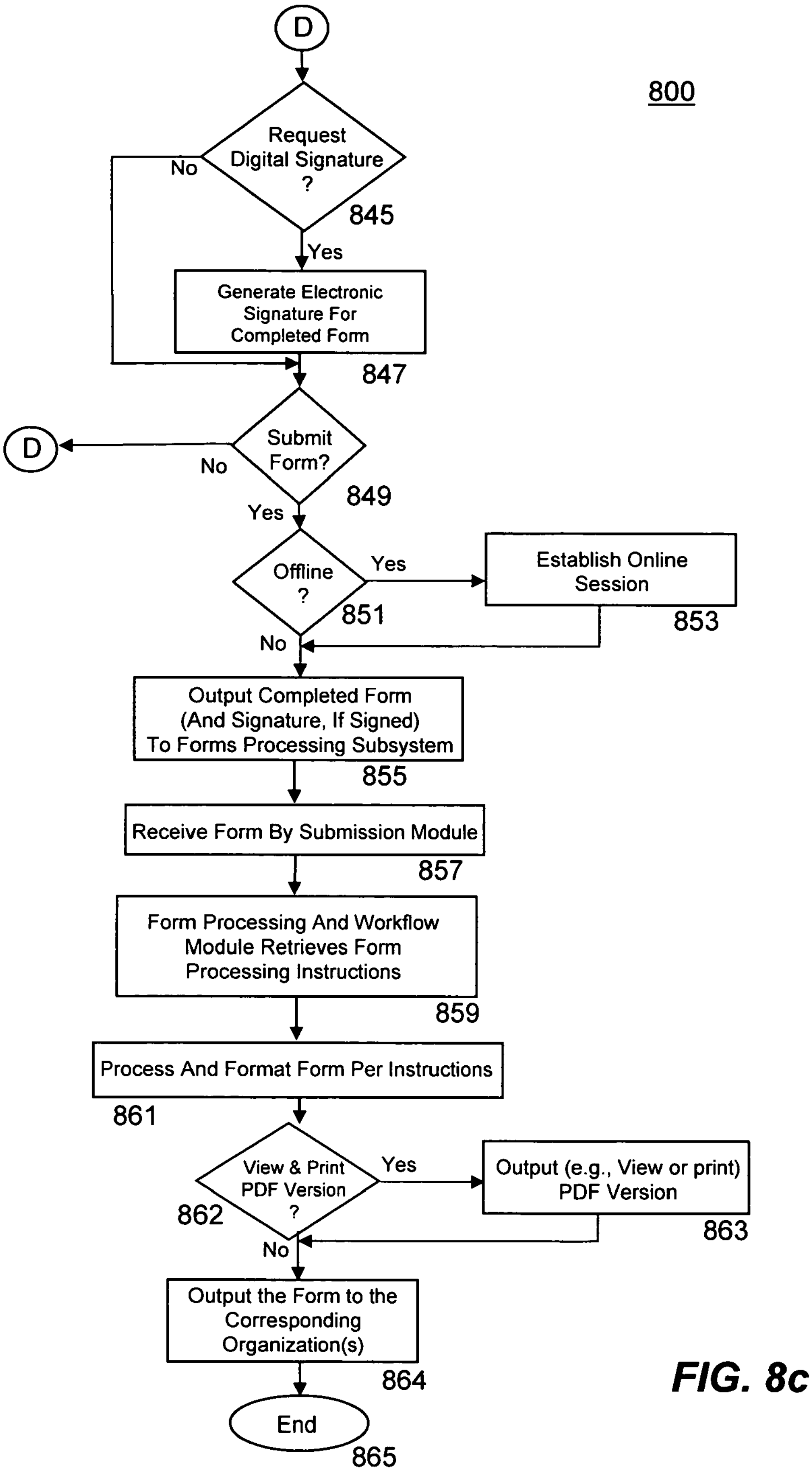

With regard to FIGS. 8*a* through 8*c*, there is shown a flow chart of a form submission processing method 800 according to an embodiment. As shown in FIG. 8, a method 800 may commence at 801 and proceed to 803, at which a method may determine if the user will interact with the client subsystem 102*a* to work on a form offline. If the user wants to work offline, then control may proceed to 807. If the user wants to work online, then control may proceed to 805 at which the client subsystem 102*a* may establish a session with the forms processing subsystem 101 as described above. Following establishment of an online session, control may proceed to 807 at which the method may include determining if the user wants to enter data into a new form.

If data for a new form is to be entered into a form for the first time, control may then proceed to 811, at which the user may search the forms maintained by the forms processing subsystem 101 for the desired form. In an embodiment, form submission manager 125 may output to the user via the browser application 129 an interactive page into which the user may enter form search criteria using, for example, the keyboard and mouse device of the client subsystem 102*a*. Upon the user entering the search criteria in the search page, the user may cause the client subsystem 102*a* to output the page containing the form search criteria to the form catalog 139 by selecting a "request" button or link. Upon receiving the search page from the client subsystem 102*a*, the form catalog 139 may formulate a database query to retrieve forms associated with the received search criteria and request the forms matching the criteria from a database. In an embodiment, the database request may be made via the form processing and workflow module 117 which verifies that the requesting user is authorized to perform the requested function on a form-by-form basis. Further, the form processing and workflow module 117 may modify the database query as required to ensure compliance with forms processing rules. The database query may then be transferred to the database, which may be included with the form catalog 139, which in response outputs a list of forms matching the search criteria. The list of forms received from the database may be in the form of an interactive link, selection of which will cause a request for the listed form to be made to the form catalog 139. The form catalog 139 may then output the list of forms matching the criteria to the user at the client subsystem 102*a* via an interactive page. An interactive page may be, for example, an HTML-formatted page. The client subsystem 102*a* may then output the list of forms to the user as an interactive page via the browser application 129. Upon user selection of the desired form from the form list, a request for the form may be sent from the client subsystem 102*a* to the form catalog 139. The form catalog 139 may then retrieve the requested form from its database as described above, and then output the form as an interactive page to the user at the client subsystem 102*a*.

Control may then proceed to 815 and 817. At 815, the client subsystem 102*a* may receive the requested form and output the form to the user as an interactive page via the browser application 129. At 819, the client subsystem 102*a* may receive all or a portion of the form data element cross-reference index to related forms, as well as other forms-related data, along with the form received at 817. Control may then proceed to 819, at which the form submission manager 125 may identify forms that are related to the requested form using the form data element cross-reference index. Control may then proceed to 821, at which the form submission manager 125 may retrieve prepopulated data from related forms from local storage at the client subsystem 102*a* such as, for example, the client data store 127.

If at 807 it is determined that the form to be edited or completed (e.g., populated) is not a new form, then control may proceed to 809 to determine if a previous version of the form, which may be a partially completed form, is present at the client subsystem 102*a*. If at 809 it is determined that a previous version of the form is present locally, then control may proceed to 813. If not, control may return to 807. At 813, the form submission manager 125 may retrieve the previous version of the form from the client data store 127.

Following 821 or 813, control may proceed to 823 at which the form submission manager 125 may associate prepopulated data from related forms and from previous versions with corresponding data fields of the instant form to be output. Control may then proceed to 825, at which the form submission manager 125 may output the form including the prepopulated data from 823 to the user for editing or entering data. In an embodiment, the form may be output to the user as an interactive page using the browser application 129. The interactive page may be an HTML formatted browser page. After the form has been output to the user, control may proceed to either 827 or 829. At 827, it may be determined whether the user wants to modify one or more prepopulated data values. If so, then control may proceed to 831, at which the user may enter changes or modifications to prepopulated data contained in data entry fields of the form. At 829, it may be determined whether the user wants to enter additional or missing data values. If so, then control may proceed to 833, at which the user may enter additional data into the corresponding data entry fields of the form. Control may then proceed to 835 to determine if the form has been completed. If not, control may proceed to 837 to determine if the user desires to save the partially completed form. If the form has been completed, control may then proceed to 839 to determine if the user desires to save the completed form.

If at 837 it is determined that the user desires to save the partially completed form, then control may proceed to 841. At 841, the form submission manager 125 may store the partially completed form locally using the client data store 127. In an embodiment, the partially completed form may be stored as an XML formatted document. After the partially completed form has been saved, control may return to 801 for further processing.

If at 839 it is determined that the user desires to save the completed form, then control may proceed to 843. At 843, the form submission manager 125 may store the completed form locally using the client data store 127. In an embodiment, as with the partially completed form, the completed form may be stored as an XML formatted document. After the completed form has been saved, control may then proceed to 845. At 845, it may be determined if the form is to be electronically signed or otherwise authenticated. If so, control may proceed to 847 at which the client subsystem 102*a* may generate and associate an electronic signature to the form. Control may then proceed to 849, at which it may be determined if the completed form is to be submitted. If not, control may return to 839 to determine if the completed and signed form is to be saved; if so, processing proceeds from 839 as described herein.

If the completed (and signed, if appropriate) form is to be submitted, control may proceed to 851 at which it may be determined if the client subsystem 102*a* is offline relative to communications with the forms processing subsystem 101. If the client subsystem 102*a* is offline, control may proceed to 853 at which the client subsystem 102*a* and the forms processing subsystem 101 may establish an online session for communication as described herein. Control may then proceed to 855, at which the client subsystem 102*a* may output the completed (and signed, if appropriate) form to the forms processing subsystem 101. Control may then proceed to 857, at which the completed form may be received by the submission module 113. Control may then proceed to 859, at which the form processing and workflow module 117 retrieves workflow rules associated with the submitted form and provides the rules to the submission module 113. Control may then proceed to 861, at which the submission module 113 may process and format the completed form in the manner specified by the workflow rules. If at 862 a PDF version of a form is requested, then control may proceed to 863 at which the print module 115 may generate a PDF version of the form and output the PDF version to a printed forms generator application.

Control may then proceed to 864, at which the submission module 113 may output the form to the corresponding organization 103 associated with the form. The association may be maintained and stored at the submission module 113. Control may then proceed to 865, at which the method may end.

Figure 9:
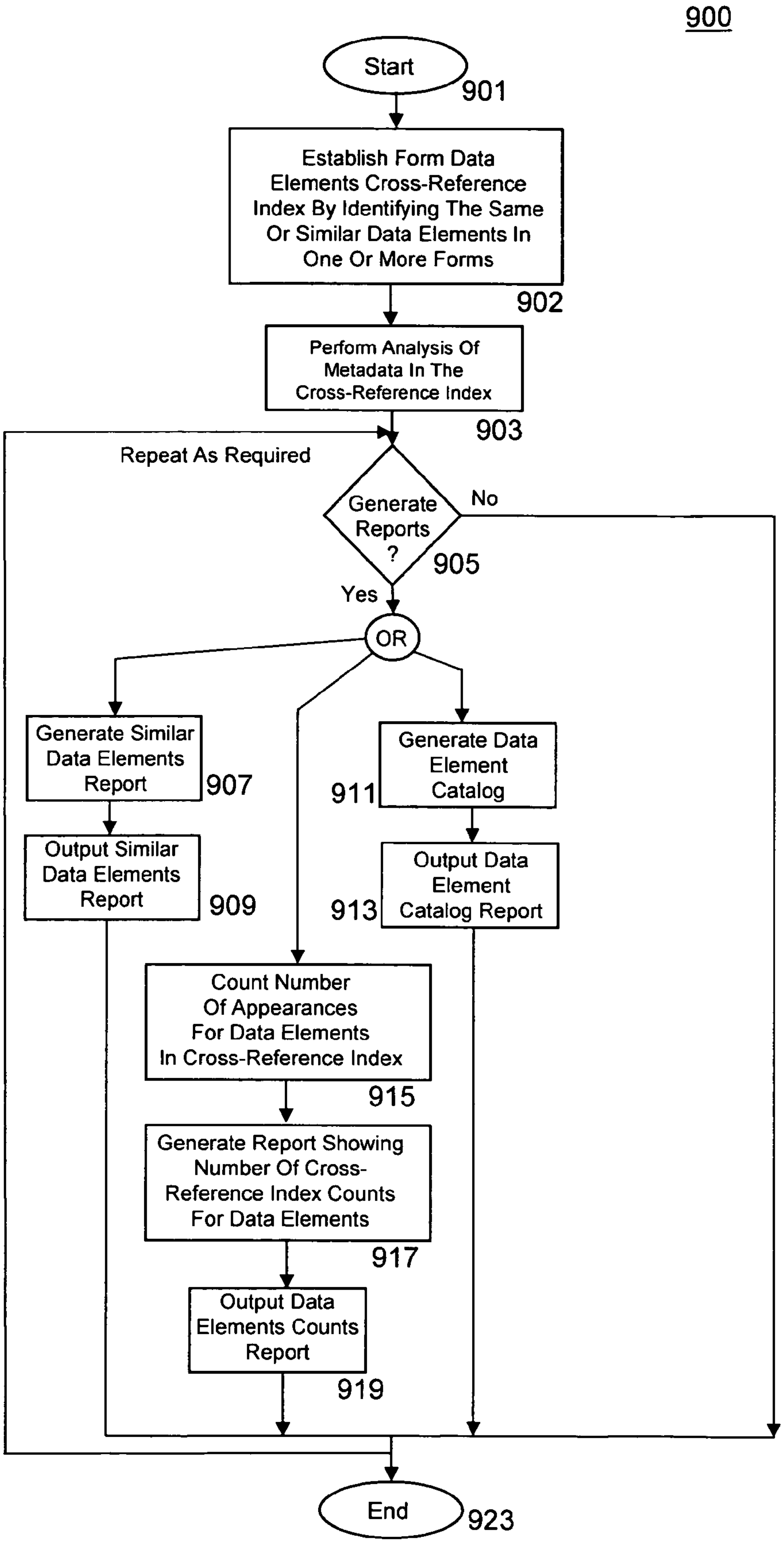
FIG. 9 is a flow chart of a method for establishing and outputting reports for a form data element cross-reference index according to at least one embodiment.

With regard to FIG. 9, there is shown a method for establishing a form data element cross-reference index, performing analysis of the metadata associated therewith, and outputting reports describing the analysis results according to at least one embodiment. As shown in FIG. 9, a method 900 may commence at 901 and proceed to 902, at which a method may include establishing a form data element cross-reference index by identifying the same or similar data elements occurring in one or more forms as described herein. After the common data elements have been identified, control may proceed to 903, at which the data repository 119 of the forms processing subsystem 101 may perform various analyses of the metadata associated with the cross-reference index as described herein. Control may then proceed to 905, at which it may be determined if the user desires to generate one or more reports describing the analyses. If not, then control may proceed to 923 at which the method may end.

If a similar data elements report is requested, then control may proceed to 907 at which the data repository 119 may generate a similar data elements report based on the analysis of the metadata associated with the form data element cross-reference index. Following 907, control may proceed to 909 at which the print module 115 may output the similar data elements report to a user via a display or a printing device of the forms processing subsystem 101. Alternatively, the report may be output to a requesting user at a client subsystem 102*b*. FIG. 11 is an example similar data elements report in accordance with at least one embodiment.

If a report describing the number of appearances for data elements in the cross-reference index is requested, then control may proceed from 905 to 915 at which the data repository 119 may count the number of times data elements appear in the cross-reference index. Control may then proceed to 917, at which the data repository 119 may generate a report describing the number of appearances for data elements in the cross-reference index based on the analysis of the metadata associated with the form data element cross-reference index. Following 917, control may proceed to 919 at which the print module 115 may output this report to a user via a display or a printing device of the forms processing subsystem 101. Alternatively, the report may be output to a requesting user at a client subsystem 102. FIG. 12 is an example cross reference counts report in accordance with at least one embodiment.

If a data elements report for the data elements contained in the cross-reference index is requested, then control may proceed from 905 to 911 at which the data repository 119 may generate a report listing the data elements in the cross-reference index. Following 911, control may proceed to 913 at which the print module 115 may output this report to a user via a display or a printing device of the forms processing subsystem 101. Alternatively, the report may be output to a requesting user at a client subsystem 102. FIG. 13 is an example data elements catalog in accordance with at least one embodiment.

Following the output of a report, control may return to 905 for the processing and output of additional reports as required. If there are no further reports to be output, control may proceed to 923 at which the method may end. The reports described herein are examples; other reports are possible.

Figure 10:
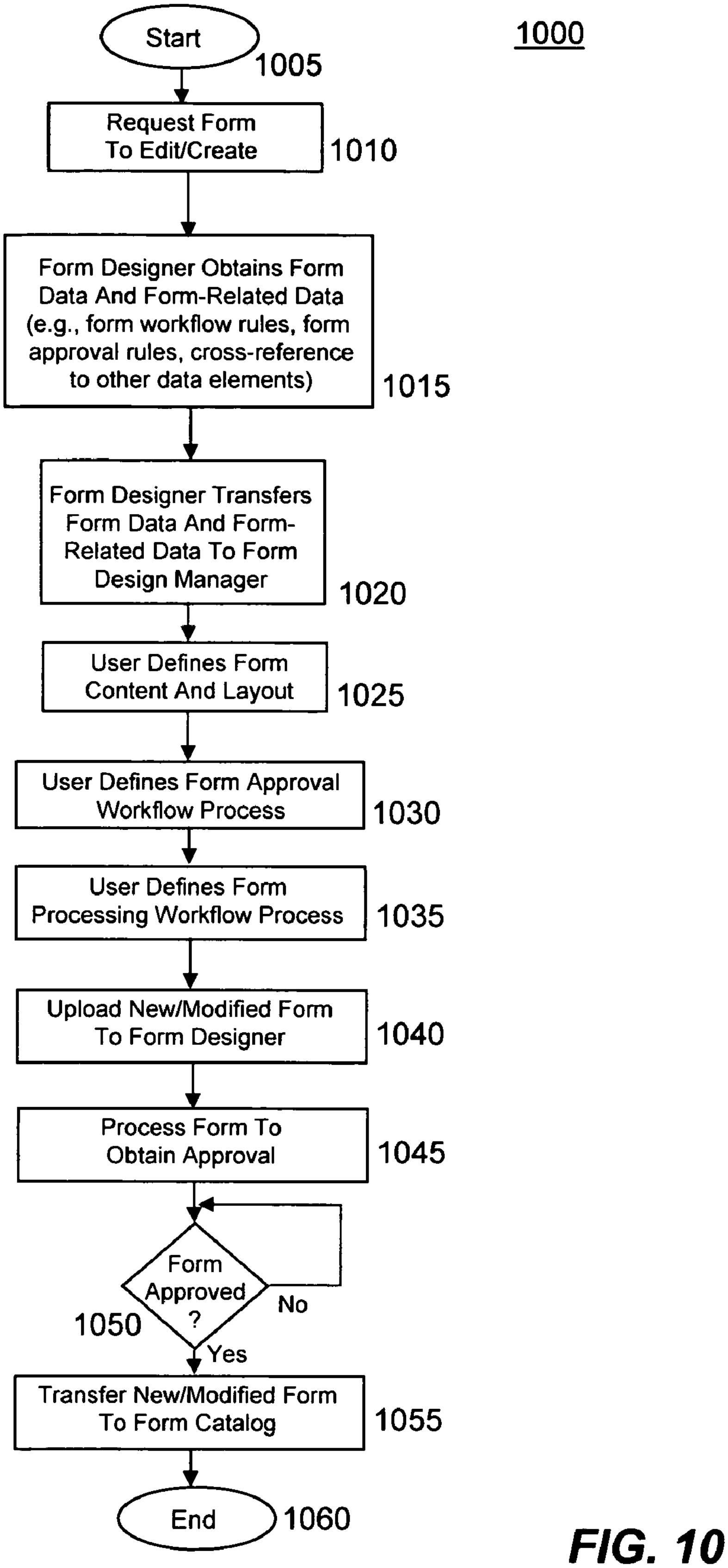
FIG. 10 is a flow chart of form design method according to at least one embodiment.

With regard to FIG. 10, there is shown a flow chart of a form design method 1000 according to an embodiment. As shown in FIG. 10, a form design method 1000 may commence at 1005 and proceed to 1010, at which the design client subsystem 102*b* may send a request to the form designer 111 for the form via the browser application 129. Control may then proceed to 1015, at which the form designer 111 may obtain the requested form data and form-related data. Form related data may include form workflow rules, form approval rules, and a cross-reference from the data elements in the requested form to corresponding data elements contained in other forms. Control may then proceed to 1020, at which the form designer 111 transfer the form data and form-related data to the design client subsystem 102*b*.

Control may then proceed to 1025, at which the user may interact with the design client subsystem 102*b* to define the content and layout (including, for example, the data entry fields for the form and their locations) using a workspace for the form. Control may then proceed to 1030, at which the user may interact with the design client subsystem 102*b* to define a form approval workflow process for the form. Control may then proceed to 1035, at which the user may interact with the design client subsystem 102*b* to define form processing workflow rules for the form. Control may then proceed to 1040, at which the user may upload the new or modified form to the form designer 111. Control may then proceed to 1045, at which the form designer 111 may process the new or modified form in accordance with rules specified by the form approval system 203 to obtain approval for the new or modified form. After the new or modified form has been approved at 1050, control may proceed to 1055. At 1055, the form designer 111 may output the approved form to the form catalog 139. Control may then proceed to 1060, at which a method may end.

Thus, the systems and methods of the embodiments described herein may provide data collection and processing. For example, various embodiments may be directed to a method and system for establishing a form data elements cross-reference index, retrieving prepopulation data from a local client data store based on the cross-reference index, and outputting a prepopulated form to a user. Embodiments may also include a forms processing subsystem including a form designer and a form processing and workflow module, and a client subsystem including a form submission manager and a client data store.

While embodiments of the invention have been described above, it is evident that many alternatives, modifications and variations will be apparent to those skilled in the art. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents.

We claim:

1. A system comprising:

a forms processing subsystem including a form designer, a form processing and workflow module, a data repository, an administrative module, and a form catalog, wherein the form processing and workflow module has more than one mode of operation, and wherein the forms processing subsystem is configured to establish a form data element cross-reference index that is stored in said data repository; and a form submission manager and a client data store, wherein the form submission manager is configured to store form prepopulation data locally using only the client data store, wherein the form submission manager is further configured to retrieve prepopulation data from only the client data store based on the cross-reference index, and wherein the form submission manager is further configured to output a form to a user in which data entry fields of the form include the stored prepopulation data, wherein the form data element cross-reference index comprises data that associates at least one data element in a first form with the same or similar data elements appearing in other forms without regard to form data or prepopulation data.

2. The system of claim 1, wherein the form submission manager is configured to identify the form prepopulation data based on the form data element cross-reference index.

3. The system of claim 1, wherein the form submission manager is further configured to store forms locally using the client data store.

4. The system of claim 3, in which the locally stored forms include partially completed forms.

5. The system of claim 1, in which the forms are stored and output in accordance with the hypertext markup language.

6. The system of claim 1, wherein forms are processed in accordance with rules maintained using the data repository, and wherein the rules define the format and contents for each form.

7. The system of claim 6, wherein the rules are received from an external organization.

8. The system of claim 7, wherein the forms processing subsystem is further configured to receive an authentication result for a form from an authentication gateway.

9. The system of claim 1, wherein the forms processing subsystem further comprises an interface to a printed forms generator application.

10. The system of claim 1, wherein the form submission manager is further configured to complete and store forms offline.

11. The system of claim 1, wherein one mode of operation of the form processing and workflow module subsystem is a pass-through mode.

12. The system of claim 1, further comprising:

a print module;

wherein the data repository is configured to analyze metadata associated with the form data element cross-reference index, and wherein the data repository is configured to output one or more reports describing the analysis results.

13. The system of claim 12, wherein the reports include a similar data elements report.

14. The system of claim 12, wherein the reports include a data elements cross-reference counts report.

15. The system of claim 12, wherein the reports include a data elements dictionary report.

16. A method comprising:

establishing a form data elements cross-reference index, the cross-reference index comprising data that associates at least one data element in a first form with the same or similar data elements appearing in other forms without regard to form data or prepopulation data;

storing in a data repository said cross-reference index comprising data that associates at least one data element in a first form with the same or similar data elements appearing in other forms without regard to form data or prepopulation data;

receiving form data and the form data elements cross-reference index to related forms for the first form;

identifying related forms based on the form data elements cross-reference index for the first form;

retrieving prepopulation data from only a local client data store based on the cross-reference index;

using the prepopulation data to associate previously entered data with corresponding data entry fields of the form;

outputting the form including the prepopulation data using a form submission manager; and accepting data entry corresponding to data entry fields of the form from a user.

17. The method of claim 16, further comprising:

obtaining a digital signature for the form after the completion of data entry for the form; and uploading the completed and signed form.

18. The method of claim 16, further comprising:

storing a partially completed form locally using the client data store.

19. The method of claim 16, further comprising:

outputting the form after the completion of data entry for the form to a back office system.

20. The method of claim 16, further comprising:

creating the form using a workspace, wherein the workspace includes a form layout grid accessible using a click and drop function.

21. The method of claim 16, further comprising:

analyzing metadata associated with the form data element cross-reference index; and outputting one or more reports describing the analysis results.

22. The method of claim 21, wherein the reports include a similar data elements report.

23. The method of claim 21, wherein the reports include a data elements cross-reference counts report.

24. The method of claim 21, wherein the reports include a data elements dictionary report.

25. A computer readable medium upon which is embedded a sequence of programmed instructions which when executed by a processor will cause the processor to perform the following steps comprising:

establishing a form data elements cross-reference index, the cross-reference index comprising data that associates at least one data element in a first form with the same or similar data elements appearing in other forms without regard to form data or prepopulation data;

storing in a data repository said cross-reference index comprising data that associates at least one data element in a first form with the same or similar data elements appearing in other forms without regard to form data or prepopulation data;

receiving form data and the form data elements cross-reference index to related forms for the first form;

identifying related forms based on the form data elements cross-reference index for the first form;

retrieving prepopulation data from only a local client data store based on the cross-reference index;

using the prepopulation data to associate previously entered data with corresponding data entry fields of the form;

outputting the form including the prepopulation data using a form submission manager; and accepting data entry corresponding to data entry fields of the form from a user.

26. The computer readable medium of claim 25, in which the sequence of programmed instructions further comprises:

obtaining a digital signature for the form after the completion of data entry for the form; and uploading the completed and signed form.

27. The computer readable medium of claim 25, in which the sequence of programmed instructions further comprises:

storing a partially completed form locally using the client data store.

28. The computer readable medium of claim 25, in which the sequence of programmed instructions further comprises:

outputting the form after the completion of data entry for the form to a back office system.

29. The computer readable medium of claim 25, in which the sequence of programmed instructions further comprises:

creating the form using a workspace, wherein the workspace includes a form layout grid accessible using a click and drop function.

30. The computer readable medium of claim 25, in which the sequence of programmed instructions further comprises:

analyzing metadata associated with the form data element cross-reference index; and outputting one or more reports describing the analysis results.

31. The computer readable medium of claim 30, wherein the reports include a similar data elements report.

32. The computer readable medium of claim 30, wherein the reports include a data elements cross-reference counts report.

33. The computer readable medium of claim 30, wherein the reports include a data elements dictionary.

* * * * *